United States Patent
Yoshida et al.

(10) Patent No.: US 8,656,033 B2
(45) Date of Patent: Feb. 18, 2014

(54) INFORMATION PROCESSING APPARATUS AND DATA PROCESSING METHOD

(75) Inventors: Hiroyoshi Yoshida, Ohta-ku (JP); Kumi Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1159 days.

(21) Appl. No.: 11/300,142

(22) Filed: Dec. 14, 2005

(65) Prior Publication Data

US 2006/0171513 A1    Aug. 3, 2006

(30) Foreign Application Priority Data

Dec. 16, 2004  (JP) ................. 2004-364776
Oct. 6, 2005   (JP) ................. 2005-294034

(51) Int. Cl.
*G06F 15/173*  (2006.01)
*G06F 3/12*    (2006.01)
*G06F 15/16*   (2006.01)

(52) U.S. Cl.
USPC ........... 709/229; 709/224; 709/225; 709/226; 358/1.15

(58) Field of Classification Search
USPC .......................................... 709/229
See application file for complete search history.

(56) References Cited

U.S. PATENT DOCUMENTS

| | | | |
|---|---|---|---|
| 6,577,907 B1 * | 6/2003 | Czyszczewski et al. | 700/17 |
| 2003/0142340 A1 * | 7/2003 | Watanabe | 358/1.14 |
| 2003/0217194 A1 * | 11/2003 | Kazumi et al. | 709/321 |
| 2005/0086240 A1 * | 4/2005 | Richardson et al. | 707/100 |
| 2005/0213166 A1 * | 9/2005 | Tsuboi | 358/474 |
| 2005/0259292 A1 * | 11/2005 | Tokimoto et al. | 358/1.15 |

FOREIGN PATENT DOCUMENTS

| | | | |
|---|---|---|---|
| JP | 5-207207 A | | 8/1993 |
| JP | 2000-134308 A | | 5/2000 |
| JP | 2002-271599 A | | 9/2002 |

* cited by examiner

*Primary Examiner* — Jason Recek
*Assistant Examiner* — Angela Nguyen
(74) *Attorney, Agent, or Firm* — Canon U.S.A. Inc. IP Division

(57) ABSTRACT

A data processing method is provided for use with an information processing apparatus capable of sending data of a sending job to an external destination and capable of selectively utilizing a plurality of types of destination specification methods as a method for specifying a destination of the data of the sending job. When a predetermined instruction is input via a user interface unit, a prespecified destination specification method among the plurality of types of destination specification methods can be automatically utilized. A user is enabled to select a destination of the data of the sending job via the user interface unit by using the prespecified destination specification method. The information processing apparatus is enabled to send the data of the sending job to the destination selected by the user via the user interface unit by using the prespecified destination specification method among the plurality of types of destination specification methods.

4 Claims, 24 Drawing Sheets

FIG.19

| No. | *nameString | *settingTable | SENDING DESTINATION SPECIFICATION METHOD |
|---|---|---|---|
| 1 | nameString1 | settingTable1 | ADDRESS BOOK |
| 2 | nameString2 | settingTable2 | null |
| 3 | nameString3 | settingTable3 | RETRIEVE FROM SERVER |
| ⋮ | ⋮ | ⋮ | ⋮ |

FIG.20

| |
|---|
| "Separate PDF" |
| "M2" |
| "M3" |
| ⋮ |
| ⋮ |

| |
|---|
| "SCANING COLOR: COLOR", "RESOLUTION 400×400 dpi", "FILE FORMAT: P |
| "SCANING COLOR: AUTO", "RESOLUTION 200×200 dpi", "FILE FORMAT: TI |
| "SCANING COLOR: AUTO", "RESOLUTION 200×200 dpi", "FILE FORMAT: P |
| null |
| null |

| No. | *nameString | *settingTable |
|---|---|---|
| 1 | nameString1 | settingTable1 |
| 2 | nameString2 | settingTable2 |
| 3 | nameString3 | settingTable3 |
| ⋮ | ⋮ | ⋮ |

INFORMATION PROCESSING APPARATUS AND DATA PROCESSING METHOD

BACKGROUND OF THE INVENTION

1. Field of the Invention

The present invention relates to an information processing apparatus, such as a digital multifunction machine, a facsimile apparatus, a printer apparatus, and the like, provided with a function for sending data, and relates to a data processing method.

2. Description of the Related Art

At the present time, information processing apparatuses, such as digital multifunction machines, include apparatuses installed with a sending/FAX function for sending a read image by e-mail, FTP, or facsimile. In the sending/FAX function, it is possible to register a routine work in order to simply carry out sending of an image, and it is possible to change a content of transmission and a destination of transmission by performing a prescribed operation.

For example, Japanese Patent Application Laid-Open No. 05-207207 discloses that a destination telephone number and an operation mode can be registered and recalled with a one-touch program key, that a content of transmission and a destination of transmission can be changed by performing a prescribed operation, and that an overseas time display mode is provided such that a facsimile can be sent in consideration of the local time of each foreign country.

However, in the conventional technology, there is a problem such that when a routine work is recalled, many operational processes are required in a work flow for adding or changing a sending destination.

In addition, it is assumed possible to register a destination and an operation mode according to the disclosure in Japanese Patent Application Laid-Open No. 05-207207. However, in a case where the destination is not yet registered, it is not possible to make a registration as to with what procedure the destination is recalled. In such a configuration as disclosed in Japanese Patent Application Laid-Open No. 05-207207, the process of inputting a destination is too complicated for a user, and thus, a problem may arise in that operability is not favorable to the user.

SUMMARY OF THE INVENTION

The present invention is directed to an information processing apparatus and a data processing method capable of solving the aforementioned problems.

Furthermore, the present invention is directed to an information processing apparatus and a data processing method capable of making an operational process required for a user in the case of sending data as simple as possible and also capable of structuring a data sending environment in which operability is favorable to the user.

Furthermore, the present invention is directed to a information processing apparatus and a data processing method capable of minimizing an operational process for specifying and changing a sending destination related to sending of data.

In one aspect of the present invention, a data processing method for use with an information processing apparatus capable of sending data of a sending job to an external destination and capable of selectively utilizing a plurality of types of destination specification methods as a method for specifying a destination of the data of the sending job includes the steps of, when a predetermined instruction is inputted via a user interface unit, automatically enabling utilizing a prespecified destination specification method among the plurality of types of destination specification methods and enabling a user to select a destination of the data of the sending job via the user interface unit by using the prespecified destination specification method, and enabling the information processing apparatus to send the data of the sending job to the destination selected by the user via the user interface unit by using the prespecified destination specification method among the plurality of types of destination specification methods.

In another aspect of the present invention, an information processing apparatus capable of sending data of a sending job to an external destination and capable of selectively utilizing a plurality of types of destination specification methods as a method for specifying a destination of the data of the sending job includes an operation controller configured to, when a predetermined instruction is inputted via a user interface unit, automatically enable utilizing a prespecified destination specification method among the plurality of types of destination specification methods and to enable a user to select a destination of the data of the sending job via the user interface unit by using the prespecified destination specification method, and a sending controller configured to enable the information processing apparatus to send the data of the sending job to the destination selected by the user via the user interface unit by using the prespecified destination specification method among the plurality of types of destination specification methods.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate several embodiments of the invention and, together with the description, serve to explain the principles of the invention.

FIG. 19 is a view showing an exemplary data structure (with information on the sending destination specification method being added) for managing the content of the routine work.

FIG. 20 is a view showing an exemplary data structure for managing a name to be registered for the routine work.

DETAILED DESCRIPTION OF THE EMBODIMENTS

Numerous exemplary embodiments, features and aspects of the present invention will be described in detail below with reference to the drawings.

Exemplary Network Configuration

Figure 1:
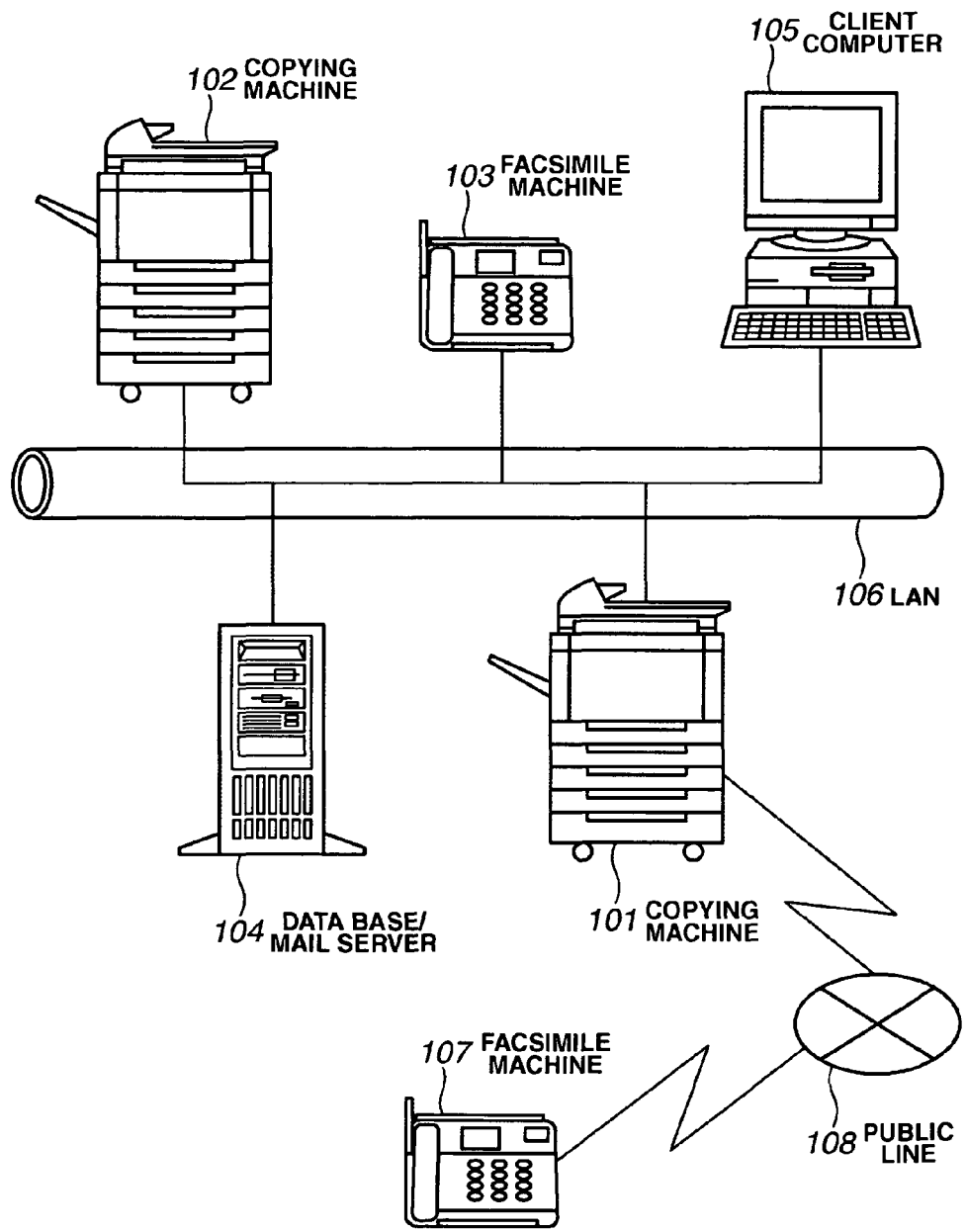
FIG. 1 is a view showing a configuration of an exemplary network accommodating a multifunction apparatus according to a first embodiment of the present invention.

FIG. 1 is a view showing a configuration of an exemplary network that accommodates a multifunction apparatus in common to each of the embodiments according to the present invention. With regard to the multifunction apparatus of this embodiment, a digital copying machine having a data sending and receiving function, for example, is explained as one example of an information processing apparatus.

As shown in FIG. 1, a copying machine 101 is connected to a LAN 106 configured by ETHERNET or the like, together with a copying machine 102 with a function equivalent to the function of the copying machine 101, a facsimile machine 103, a data base/mail server 104, and a client computer 105. In addition, the copying machine 101 is connected to a public line 108 together with a facsimile machine 107.

The copying machine 101 is provided with a copying function, a facsimile function, and a data sending function for reading an original image and sending the image data that is obtained by the reading to each device on the LAN 106. In addition, the copying machine 101 is provided with a page description language (PDL) function, and accordingly, is capable of receiving and printing a PDL image sent from a computer connected to the LAN 106.

The copying machine 101 is capable of storing the image read by the copying machine 101 and the PDL image sent from the computer connected to the LAN 106 in a specified box area of a hard disk drive 204 (see FIG. 2) in the copying machine 101 and is also capable of printing the image stored in the box area.

The copying machine 101 is capable of receiving the data read by the copying machine 102 via the LAN 106, storing the received data in the hard disk drive 204 and printing out the data. In addition, the copying machine 101 is capable of receiving the image stored in the data base/mail server 104 via the client computer 105 and the LAN 106, storing the received image in the copying machine 101, and printing out the image. The facsimile machine 103 is capable of receiving the data read by the copying machine 101 via the LAN 106 and sending the received data.

The data base/mail server 104 is a server device having a function for receiving the data read by the copying machine 101 via the LAN 106, storing the received data as a database, and sending the received data as e-mail.

The client computer 105 is capable of obtaining prescribed data from the data base/mail server 104 and displaying the obtained data, by being connected to the data base/mail server 104. The client computer 105 is also capable of receiving the data read by the copying machine 101 via the LAN 106 and processing and editing the received data.

The facsimile machine 107 is capable of receiving the data read by the copying machine 101 via the public line 108 and printing out the received data.

Exemplary Configuration of Copying Machine

Figure 2:
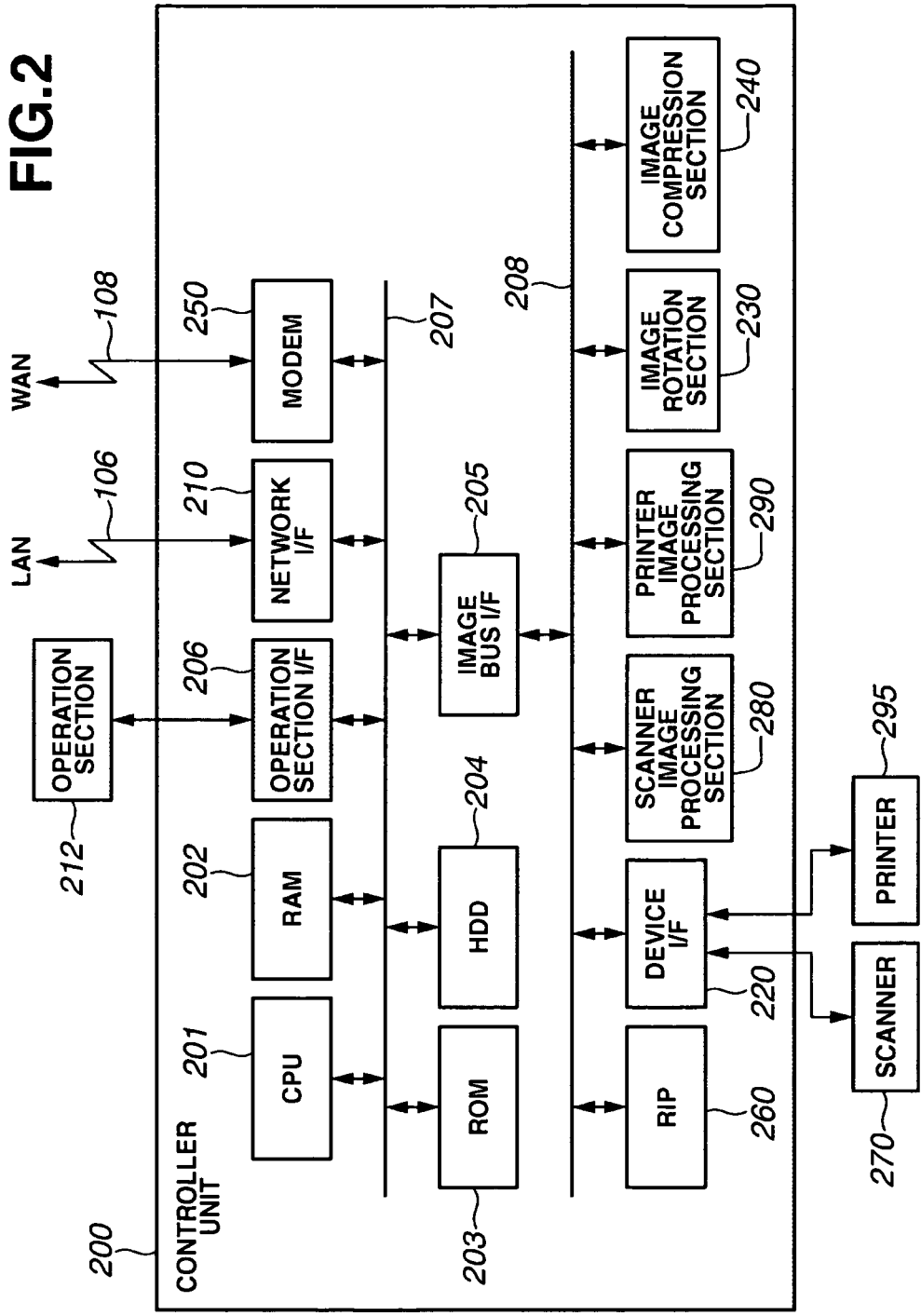
FIG. 2 is a block diagram showing an exemplary configuration of a copying machine.

FIG. 2 is a block diagram showing an exemplary configuration of a main portion of the copying machine 101. The copying machine 101 includes a controller unit 200. A scanner 270 (i.e., an image input device), a printer 295 (i.e., an image output device), and an operation section 212 are connected to be in communication with the controller unit 200. The controller unit 200 carries out a control for implementing a copying function for printing out the image data by printer 295 read by the scanner 270 and also carries out control for inputting and outputting image information and device information by being connected to the LAN 106 and the public line 108 (WAN).

The controller unit 200, more specifically, is provided with a CPU 201. The CPU 201 activates an operating system (OS) by a boot program stored in a ROM 203, executes an application program stored in the hard disk drive (HDD) 204 on the OS, and thereby carries out various kinds of processings. For a work area of the CPU 201, a RAM 202 is used. The RAM 202 provides the work area and also provides an image memory area for temporarily storing the image data. The hard disk drive 204 stores the application program and the image data.

The ROM 203, the RAM 202, an operation section interface (operation section I/F) 206, a network interface (network I/F) 210, a modem 250, and an image bus interface (image bus I/F) 205 are connected to the CPU 201 via a system bus 207.

The operation section I/F 206 is an interface with the operation section 212 having a touch panel. The operation section I/F 206 outputs image data to be displayed on the operation section 212 to the operation section 212. In addition, the operation section I/F 206 transmits the information inputted by the user on the operation section 212 to the CPU 201.

In addition, the network I/F 210 is connected to the LAN 106 and inputs and outputs information between the network I/F 210 and each of the devices on the LAN 106 via the LAN 106. The modem 250 is connected to the public line 108 and inputs and outputs information via the public line 108.

The image bus I/F 205 is a bus bridge for connecting the system bus 207 and an image bus 208 that transfers the image data at a high speed and for converting a data format. The image bus 208 is configured by a PCI bus and an IEEE 1394 bus. On the image bus 208, a raster image processor (hereinafter referred to as an RIP) 260, a device I/F 220, a scanner image processing section 280, a printer image processing section 290, an image rotation section 230, and an image compression section 240 are provided.

The RIP 260 is a processor that rasterizes a PDL code into a bit map image. The scanner 270 and the printer 295 are connected to the device I/F 220. The device I/F 220 carries out conversion between synchronous image data and asynchronous image data. The scanner image processing section 280 carries out correction, processing, and editing of the inputted image data. The printer image processing section 290 carries out the correction and conversion of resolution of printed output image data in accordance with the printer 295. The image rotation section 230 rotates the image data. The image compression section 240 compresses multivalued image data into JPEG data and binary image data into data such as JBIG, MMR, MH, and the like, and carries out a decompression processing of the compressed data.

Exemplary Configuration of the Scanner and Printer

Next, an exemplary hardware configuration of the scanner 270 and the printer 295 is explained with reference to FIG. 3. In particular, FIG. 3 is a side sectional view showing the hardware configuration of the scanner 270 and the printer 295 shown in FIG. 2.

Figure 3:
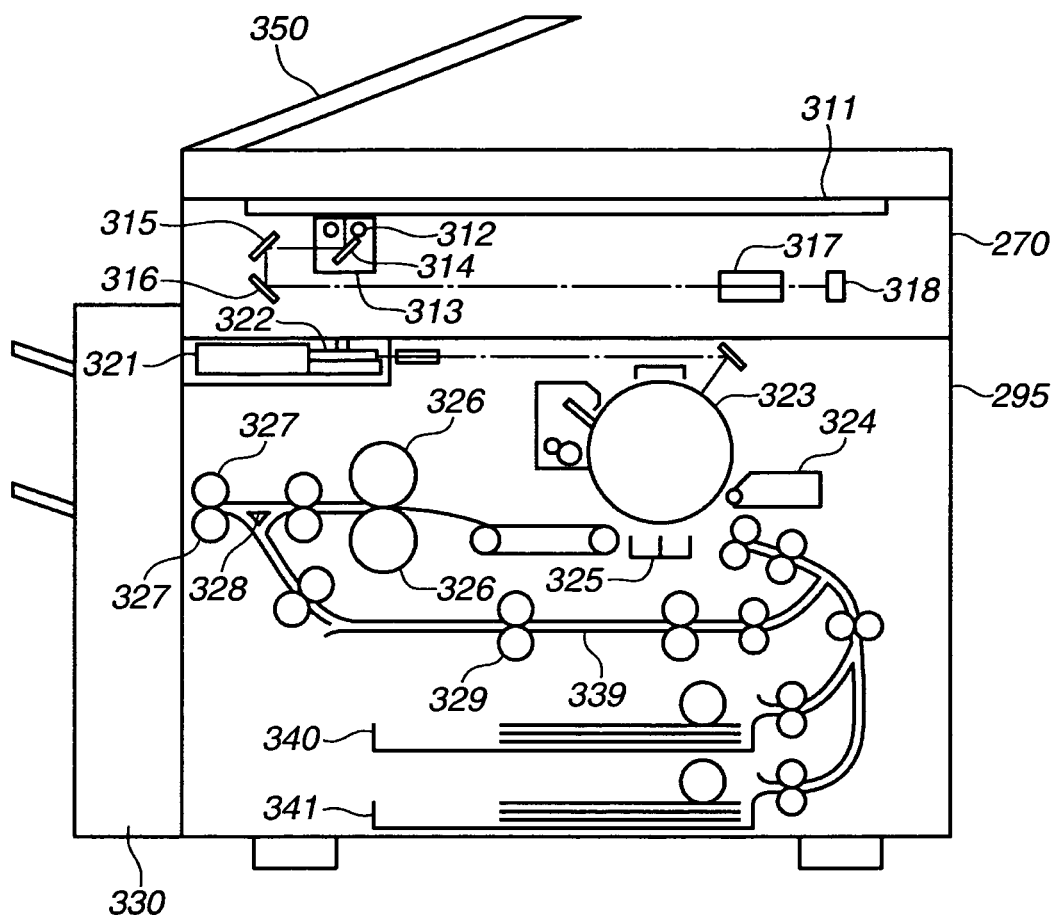
FIG. 3 is a side sectional view showing an exemplary hardware configuration of a scanner and a printer shown in FIG. 2.

The scanner 270 and the printer 295 are integrally configured as shown in FIG. 3. The scanner 270 is installed with an original feeding unit 350. The original feeding unit 350 feeds the original onto a platen glass 311 sheet by sheet in order from a top page and discharges the original from the platen glass 311 to a discharge tray (not shown) every time an operation for reading each of the sheets of the original is completed. The scanner 270 turns on a lamp 312 when the original is fed onto the platen glass 311 and then starts the movement of a moving unit 313. The original on the platen glass 311 is read and scanned by the movement of the moving unit 313. During the reading and scanning, light reflected from the original is guided to a CCD image sensor 318 via mirrors 314, 315, and 316 and a lens 317, and the image on the original is formed on an imaging surface of the CCD image sensor 318. The CCD image sensor 318 converts the image formed on the imaging surface into an electric signal, and the converted electric signal is inputted to a control device (not shown) after being subjected to a prescribed processing.

The printer 295 is provided with a laser driver 321. The laser driver 321 drives a laser beam emitting section 322 on the basis of the image data inputted from the control device. Thereby, a laser beam in accordance with the image data is emitted from the laser beam emitting section 322, and the laser beam is irradiated onto a photosensitive drum 323 while being scanned. An electrostatic latent image is formed on the photosensitive drum 323 by the irradiated laser beam, and the electrostatic latent image is visualized as a toner image by a toner supplied from a developing device 324. A recording paper sheet is fed from a cassette 340 or 341 via a conveyance path into a portion between the photosensitive drum 323 and a transferring section 325. The toner image on the photosensitive drum 323 is transferred onto the recording paper sheet fed by the transferring section 325.

The recording paper sheet onto which the toner image is transferred is fed to a pair of fixing rollers (a heating roller and a pressure roller) 326. The pair of fixing rollers 326 heats and presses the recording paper sheet and fixes the toner image on the recording paper sheet to the recording paper sheet. The recording paper sheet that passes the pair of fixing rollers 326 is discharged to a paper discharge unit 330 by a pair of discharge rollers 327. The paper discharge unit 330 is configured by a sheet processing device capable of carrying out a post-processing such as sorting, stapling, and the like.

In addition, in a case where a two-sided recording mode is set, a direction of rotation of the pair of discharge rollers 327 is reversed after the recording paper sheet is conveyed to the pair of discharge rollers 327, and the recording paper sheet is guided to a re-feed conveyance path 339 by a flapper 328. The recording paper sheet guided to the re-feed conveyance path 339 is re-fed to the portion between the photosensitive drum 323 and the transferring section 325 at the timing mentioned above, and a toner image is transferred on a back surface of the recording paper sheet.

Exemplary Configuration of Operation Section

Figure 4:
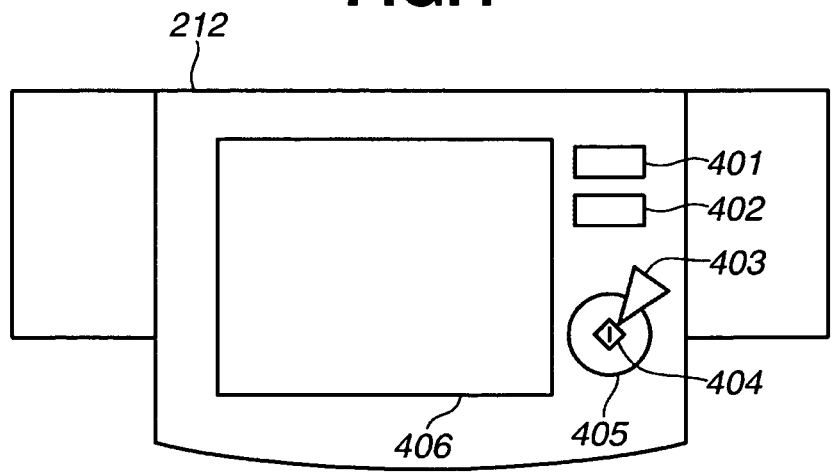
FIG. 4 is a plan view showing an exemplary configuration of an operation section shown in FIG. 2.

FIG. 4 is a plan view showing an exemplary configuration of the operation section 212 shown in FIG. 2. An display section 406 (such as an LCD) has a configuration such that a touch panel sheet is attached onto an LCD. The display section 406 displays an operation display of the copying machine 101 and, when a displayed key displayed is pushed down, transmits positional information of the key to the CPU 201 of the controller unit 200. A start key 405 is used at the time of start of the operation for reading the original image and the like.

In a center portion of the start key 405, there are provided light-emitting diodes (LEDs) 404 of two colors of green and red. The color of the LEDs 404 indicates whether the start key 405 is in a usable state or not. A stop key 403 is operated at the time of stopping the operation currently in operation. An ID key 402 is used at the time of inputting a user ID of the user. A reset key 401 is used at the time of initializing the setting set by the operation section 212.

Figure 5:
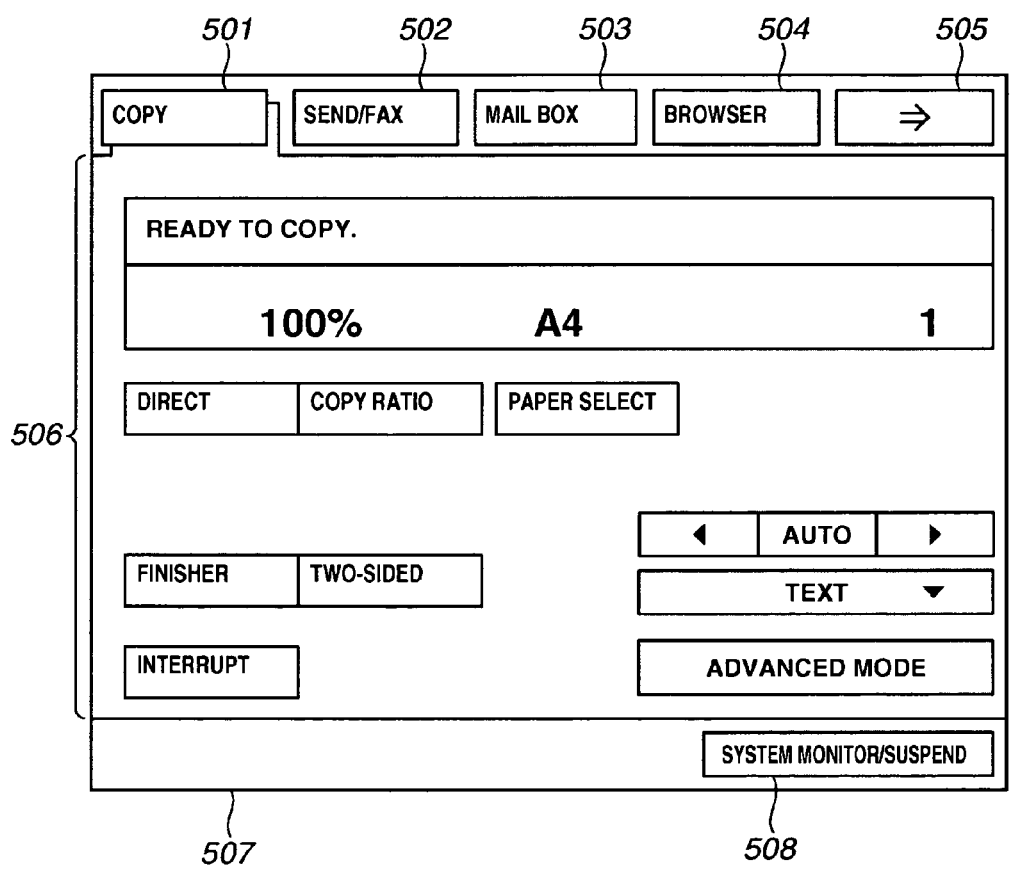
FIG. 5 is a view showing an example of an operating display shown on the operation section.

FIG. 5 is a view showing one example of an operation display which is displayed on the operation section 212. In an upper portion of the operation display of the operation section 212, a Copy tab 501, a Send/FAX tab 502, a Mail Box tab 503, a Browser tab 504, a Right Arrow tab 505 for selecting various kinds of functions, each of which is configured by a touch key, are displayed.

FIG. 5 shows an initial display of the copying function when the touch key of the Copy tab 501 is pushed down. The display in relation to the copying function is carried out in a region 506. In a region in which the message of "Ready to Copy." is indicated, which is in the upper region of the region 506, a status to be displayed in relation to the copying function is displayed, and in a region below the upper region, the magnification, the size of a paper sheet to be selected, and the number of copies to make are displayed. In addition, for the touch keys for setting an operation mode of the copying function, a Direct key, a Zoom Ratio key, a Paper Select key, a Finisher key, a Two-Sided key, an Interrupt key, a Text key, a left arrow key corresponding to a "Thinning" function for density adjustment, a right arrow key corresponding to a "Thickening" function for density adjustment, and an "Auto" key for automatically adjusting the density are displayed on the picture. In addition, a picture for instructing the operation modes that cannot be displayed in the initial picture is displayed hierarchically in the region 506 by pushing down an Advanced Mode key.

In addition, a display region 507 is a region for displaying the status of the copying machine 101. More specifically, the display region 507 is a region for displaying an alarm message indicating jamming and the like and a status message indicating that a PDL printing is being carried out when the PDL printing is currently carried out, for example. In the display region 507, a System Monitor/Suspend touch key 508 is displayed. When the System Monitor/Suspend touch key 508 is pushed down, the picture displaying the device information of the copying machine 101 and a picture displaying a print job status (not shown) are displayed. By this picture, it is possible to suspend the job.

When the Send/FAX tab 502 is pushed down, a setting display (see FIG. 6) for sending the image read by the copying machine 101 to a device on the LAN 106 by e-mail or FTP and sending a facsimile by using the public line 108 is displayed.

When the Mail Box tab 503 is pushed down, a setting display (not shown) for storing the image read by the copying machine 101 into the box area in the HDD 204, specifying the image data stored in the box area for printing, and sending the image data to a device on the LAN 106 is displayed.

In addition, in a case where five or more functions are installed in the controller unit 200, the Right Arrow key 505 is displayed to the right of the four function tabs 501 through 504 for Copy, Send/Fax, Mail Box, and Browser. When the Right Arrow key 505 is pushed down, a picture for other functions is displayed.

[First Exemplary Embodiment]

Hereinbelow, the function and the operation of the copying machine according to a first exemplary embodiment of the present invention is explained.

Figure 6:
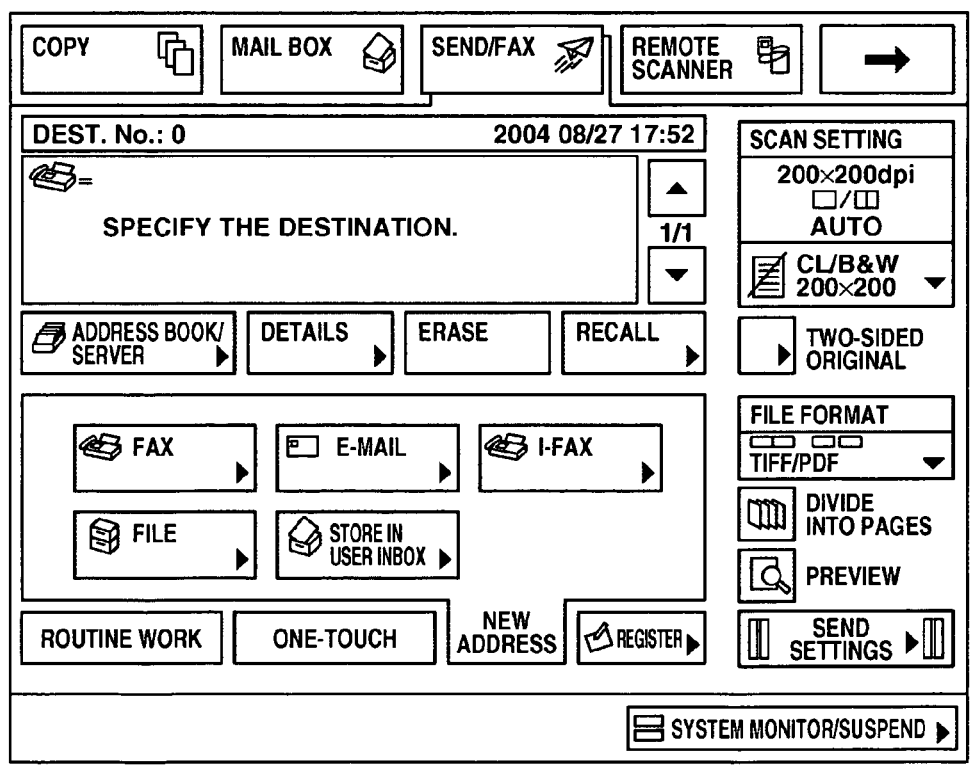
FIG. 6 is a view showing an exemplary sending display shown on the operation section when a send/FAX tab in the operation picture shown in FIG. 5 is pushed down.
Figure 7:
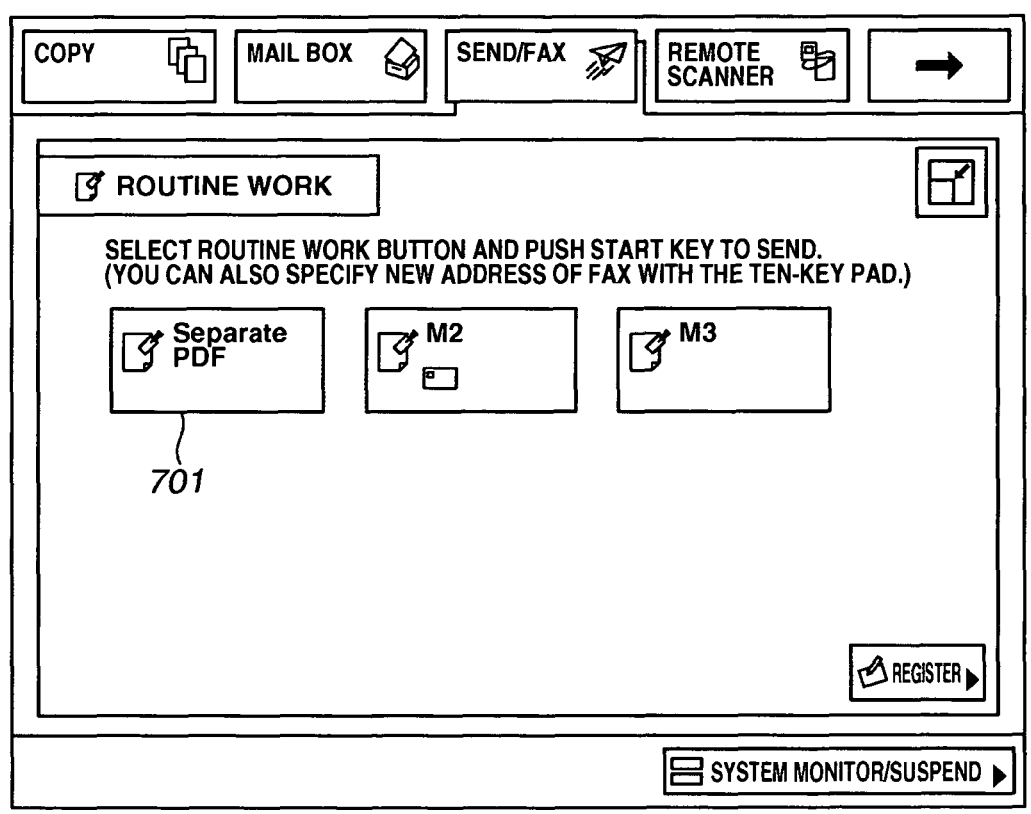
FIG. 7 is a view showing an exemplary sending routine display shown on the operation section when a send/FAX tab in the operation picture shown in FIG. 5 is pushed down or when a routine work picture is enlarged.

FIG. 6 shows an exemplary initial sending display when the Send/FAX tab 502 is pushed down. The sending display is capable of displaying a sending routine work display as shown in FIG. 7, in addition to a standard display as shown in FIG. 6, depending on the setting set by the user. That is, the first embodiment assumes modes shown in FIG. 6 and FIG. 7 with respect to the kind of the display initially displayed when the Send/FAX tab 502 is pushed down by the user.

In the sending and FAX function, there are two types of registration of the routine work, namely, a registration in which a sending destination is set and a registration in which a sending destination is not set. When the registration of the routine work is made without setting the sending destination, it is necessary to carry out specification of the destination at the time of recalling the routine work in order to send the read image. In this case, there is a convenience such that the sending destination is not always fixed with respect to a prescribed routine work.

To begin with, an exemplary registration of the routine work according to the first embodiment is explained with reference to the FIGS. 6 through 21.

Figure 8:
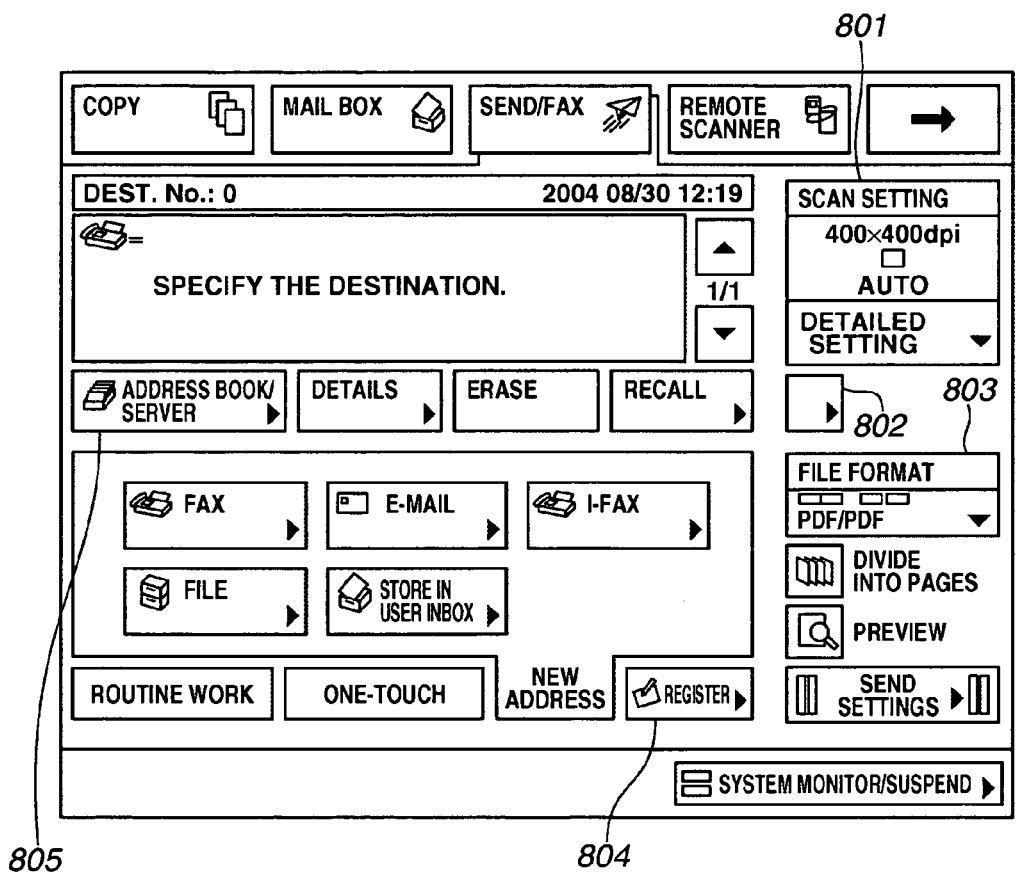
FIG. 8 is a view showing an exemplary display in which a content to be registered for the routine work is set.

In the standard sending display (default display) shown in FIG. 6, contents desired to be registered are set. That is, the setting is made so that the display is in the state as shown in FIG. 8. Note that in FIG. 8, a resolution mode 801, an original mode 802, and a file format mode 803 are changed from the default modes.

Figure 9:
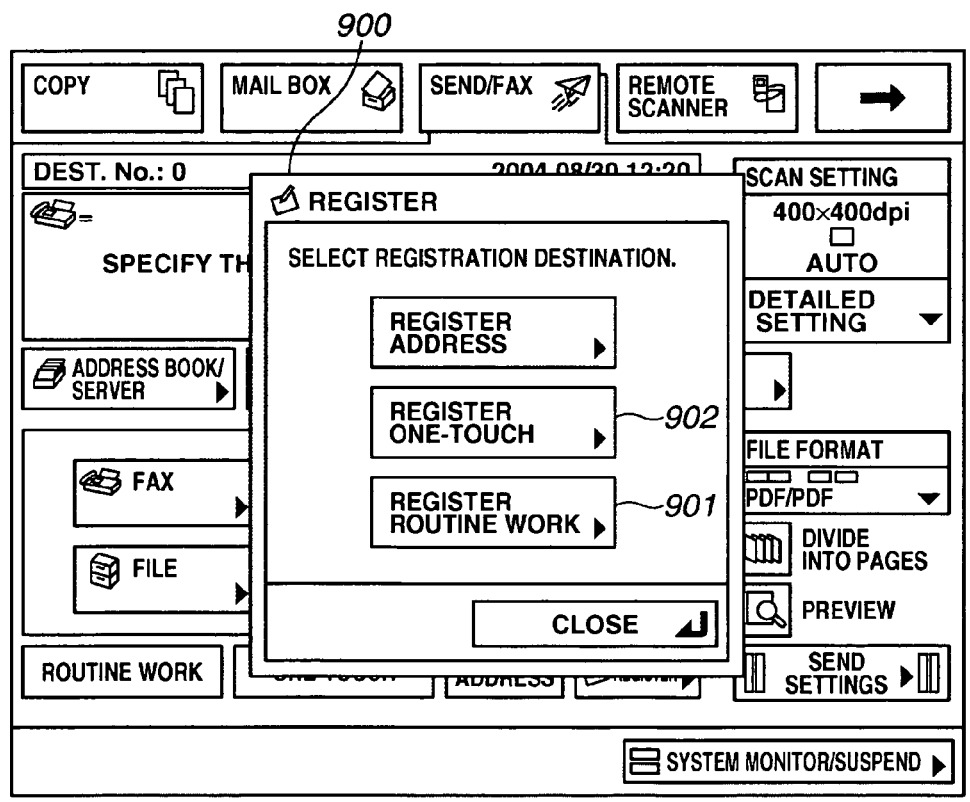
FIG. 9 is a view showing an exemplary display which includes registration selection dialogue.

When the setting is completed and a "Register" button 804 is pushed down, a registration destination selection dialogue 900 (see FIG. 9) is displayed. In FIG. 9, if a "Register Routine Work" button 901 is selected, a routine work registration confirmation dialogue 1000 (see FIG. 10) is displayed. Note that if another button, for example, a "Register One-Touch" button 902 is selected in FIG. 9, the registration destination dialogue in FIG. 8 is displayed again after the processing of registering the One-Touch button ends.

Figure 10:
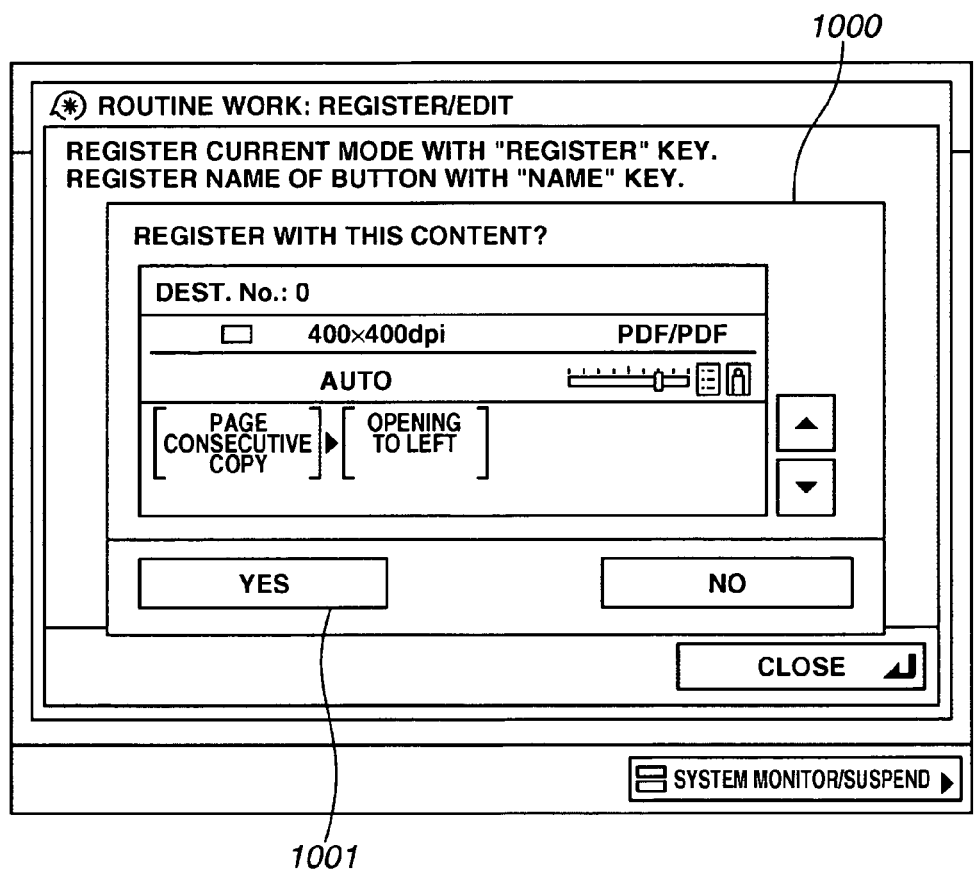
FIG. 10 is a view showing an exemplary display for confirming the content of the routine work to be registered.
Figure 11:
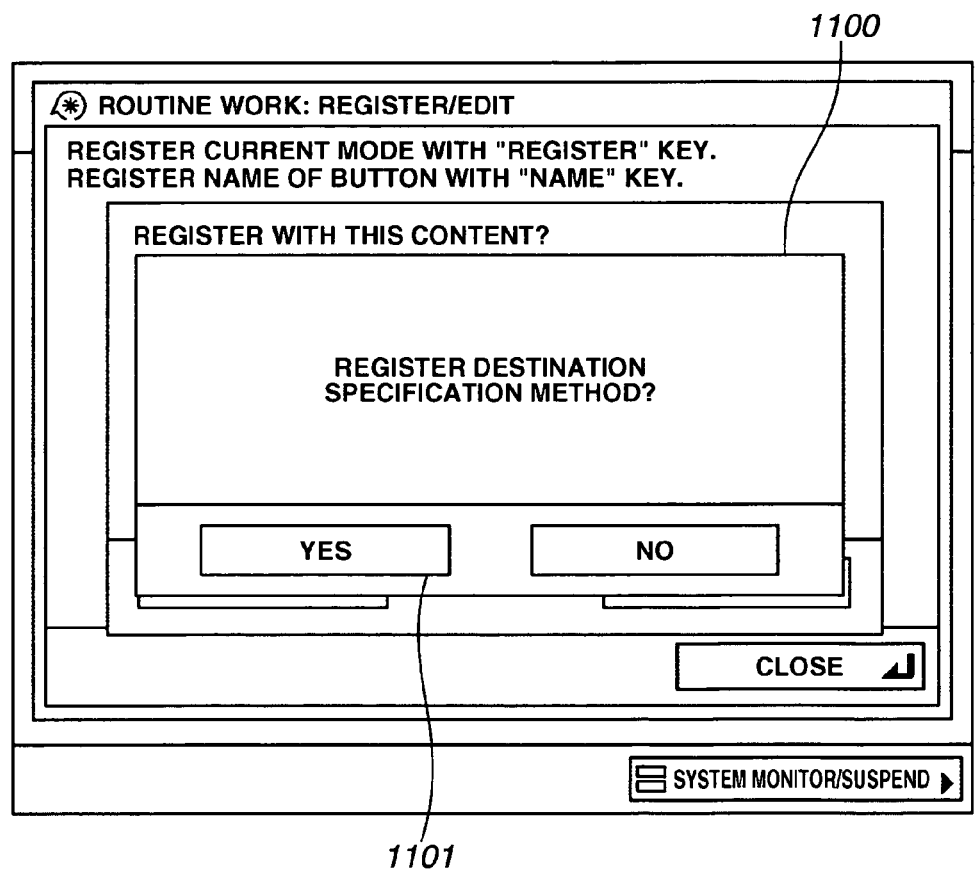
FIG. 11 is a view showing an exemplary display for confirming whether to register a sending destination specification method.

In FIG. 10, the content to be registered is displayed, and the user can confirm the contents registered by the user. Then, if a "Yes" button 1001 is selected in FIG. 10, a destination specification method registration confirmation dialogue 1100 (FIG. 11) is displayed. If a "Yes" button 1101 is selected in FIG. 11, a destination specification method selection dialogue 1200 (FIG. 12) is displayed.

Figure 12:
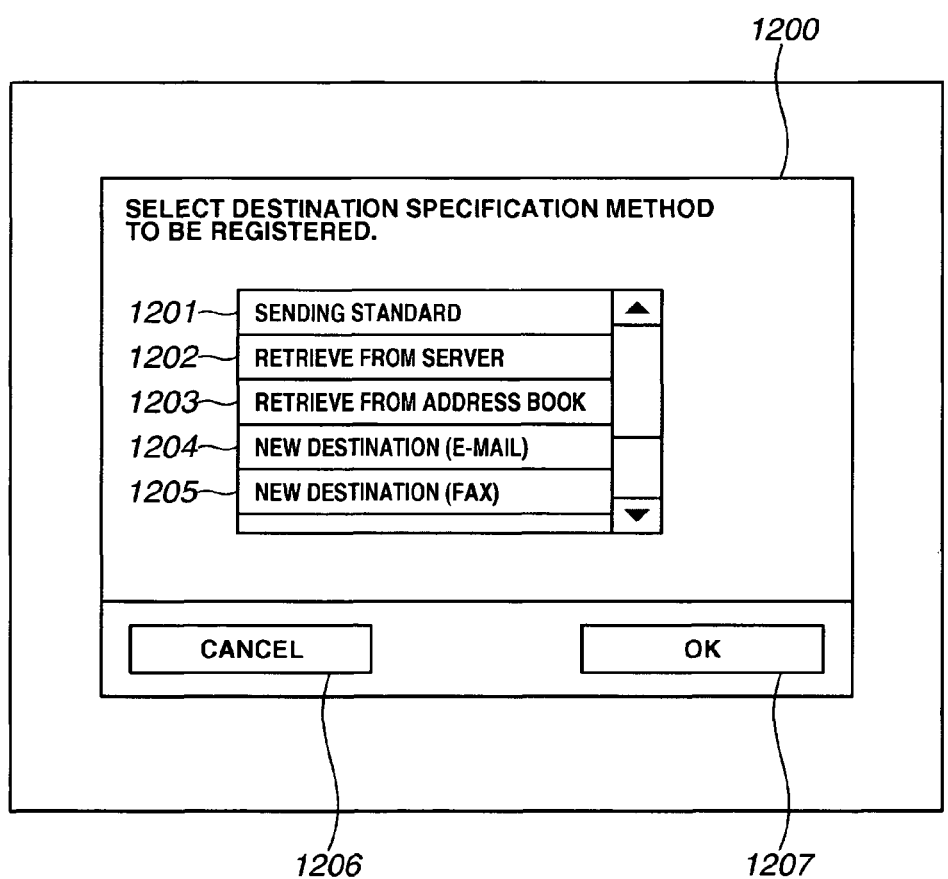
FIG. 12 is a view showing an exemplary display for selecting the sending destination specification method.
Figure 13:
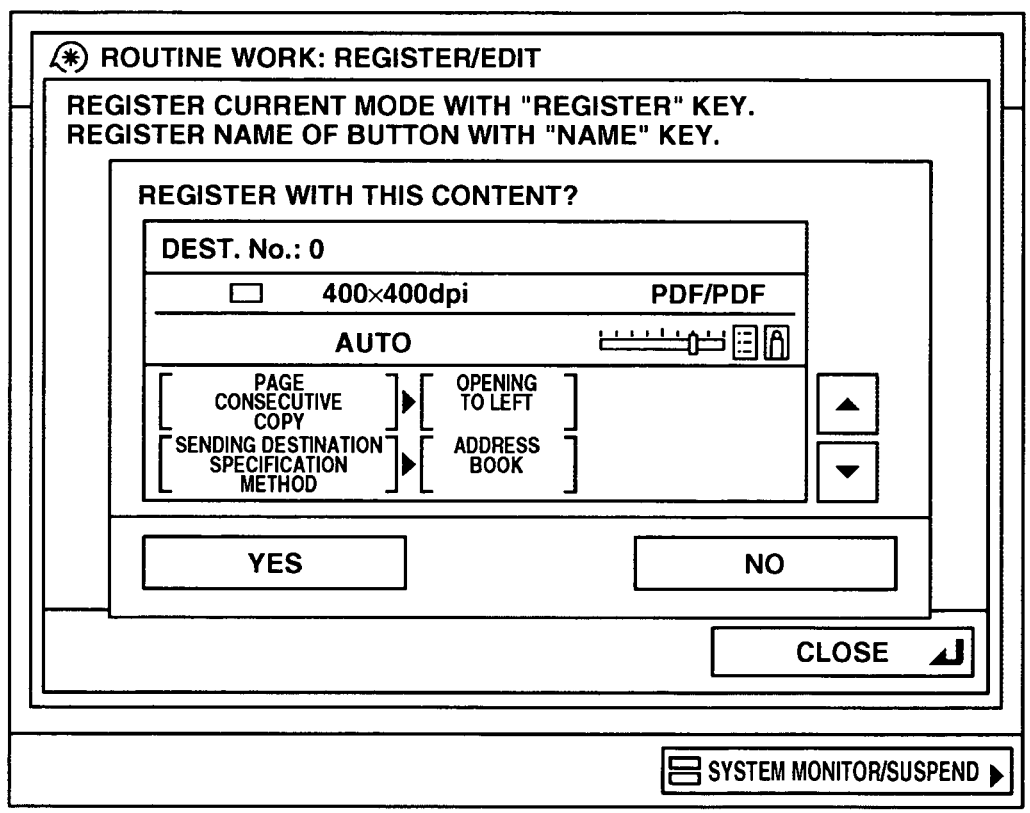
FIG. 13 is a view showing an exemplary display for confirming the content of the routine work to be registered.

In the destination specification method selection dialogue 1200 shown in FIG. 12, if a "Sending Standard" button 1201 is selected (and also, if an OK button 1207 is pushed down), a display shown in FIG. 13 is displayed and the routine work registration ends. The destination specification method used frequently is correlated with the "Sending Standard" button 1201. The correlated destination specification method correlated with the button 1201 can be changed by a user. In this embodiment, the address book as the destination specification method is correlated with the "Sending Standard" button 1201. Therefore, in this embodiment, when the "Sending Standard" button 1201 is selected, the address book is set as the sending destination specification method.

Figure 16:
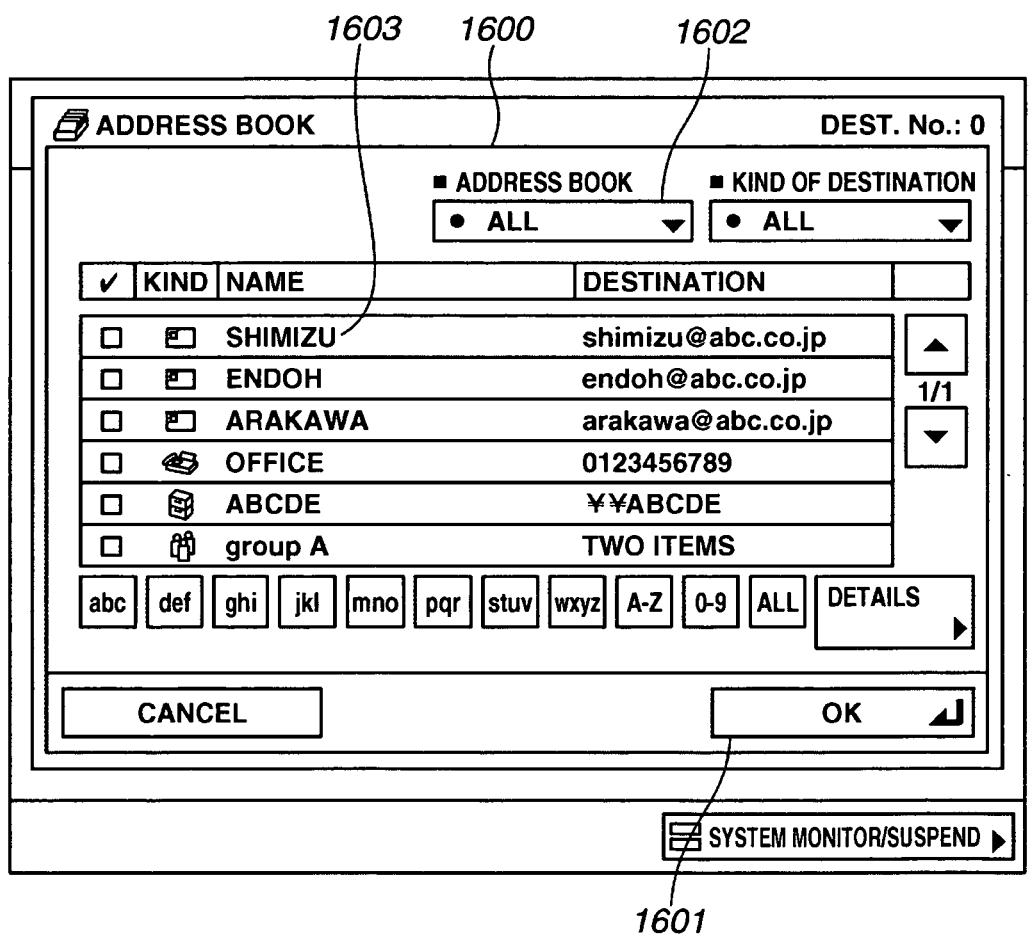
FIG. 16 is a view showing an exemplary display of an address book.

When a "Retrieve from Address Book" button 1203 is selected, the copying machine 101 is changed to a mode in which the sending destination is selected from the address book (as shown in FIG. 16, for example). If a "New Destination (E-mail)" button 1204 is selected, the copying machine 101 is changed to a mode in which the sending destination is specified by newly inputting an e-mail address. If a "New Destination (FAX)" button 1205 is selected, the copying machine 101 is changed to a mode in which the sending destination is specified by newly inputting a facsimile number.

Figure 27:
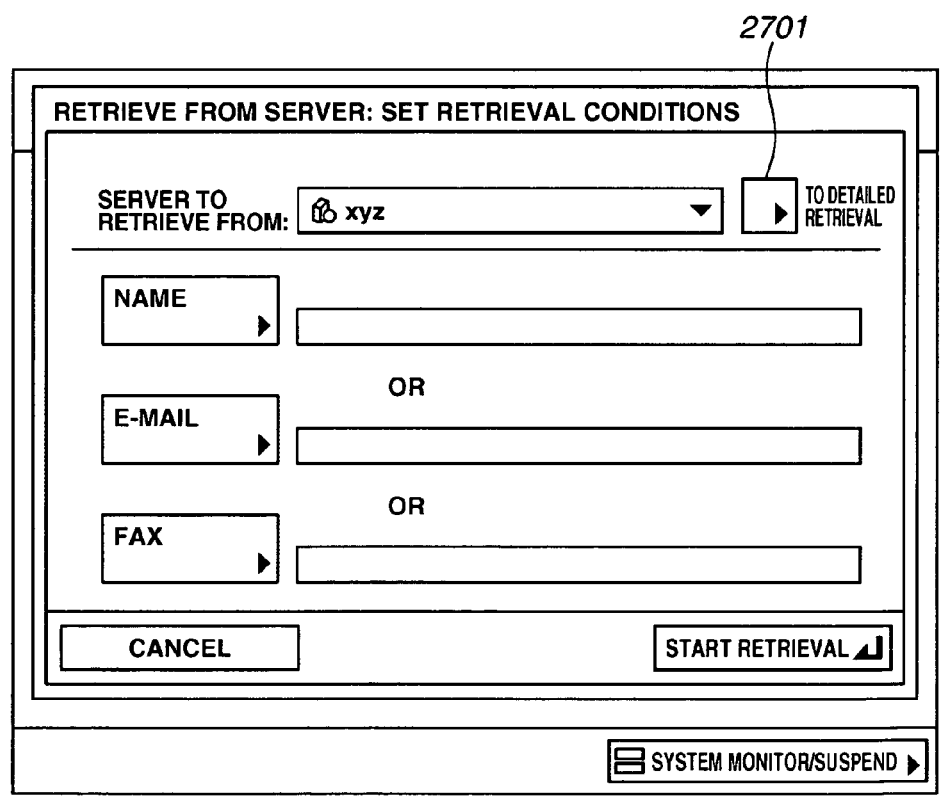
FIG. 27 is a view showing an exemplary display for a simple retrieval from the server.
Figure 28:
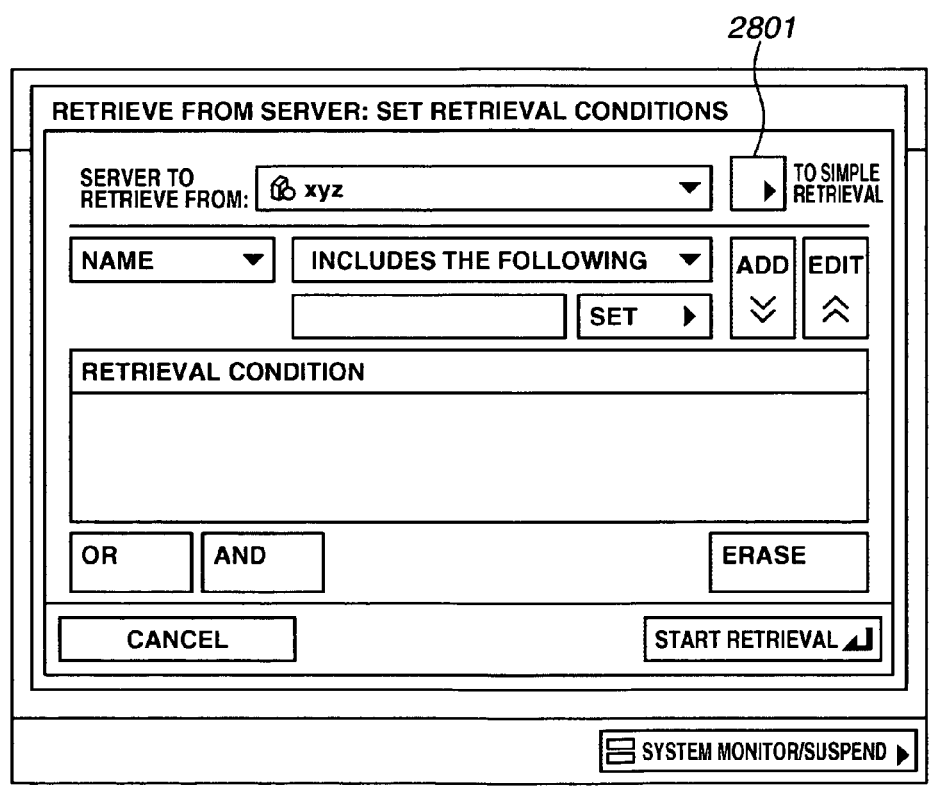
FIG. 28 is a view showing an exemplary display for a detailed retrieval from the server.

In addition, when a "Retrieve from Server" button 1202 is selected, a detailed retrieval display shown in FIG. 28 (or a simple retrieval display shown in FIG. 27) is registered as the sending destination specification method. Thus, in a case where the retrieval from the server is registered as the destination specification method, when the routine work is recalled, a display for retrieving from the server (FIG. 28 or FIG. 27) is displayed.

Figure 26:
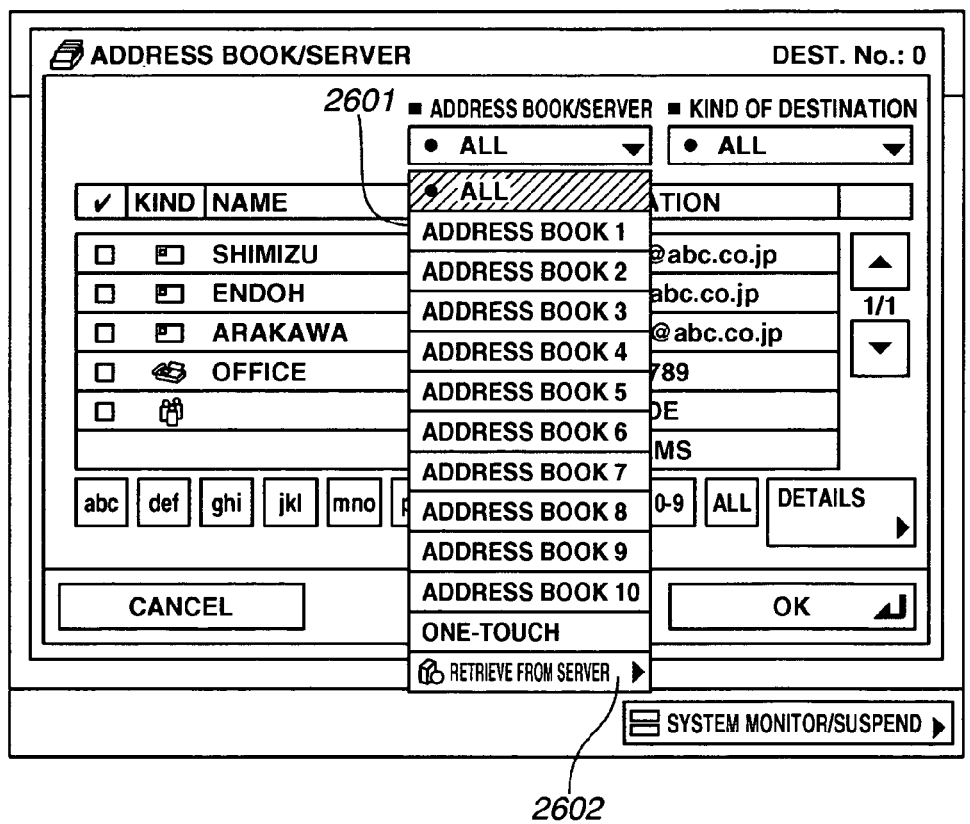
FIG. 26 is a view showing an exemplary display for shifting to the mode for retrieving from a server.

Note that transition to the mode for retrieval from the server can be carried out not only by the picture shown in FIG. 12 but also by displaying an address book 1600 shown in FIG. 16 by selecting a "Retrieval from Address Book/Server" button 805 shown in FIG. 8 (similar in FIG. 6). When an "All" button 1602 is additionally selected in a state in which the address book 1600 shown in FIG. 16 is displayed, a pull-down menu 2601 for the retrieval from the address book/server is displayed as shown in FIG. 26. When a "Retrieve from Server" button 2602 is selected in this state, the copying machine 101 advances to the mode for retrieval from the server.

Figure 14:
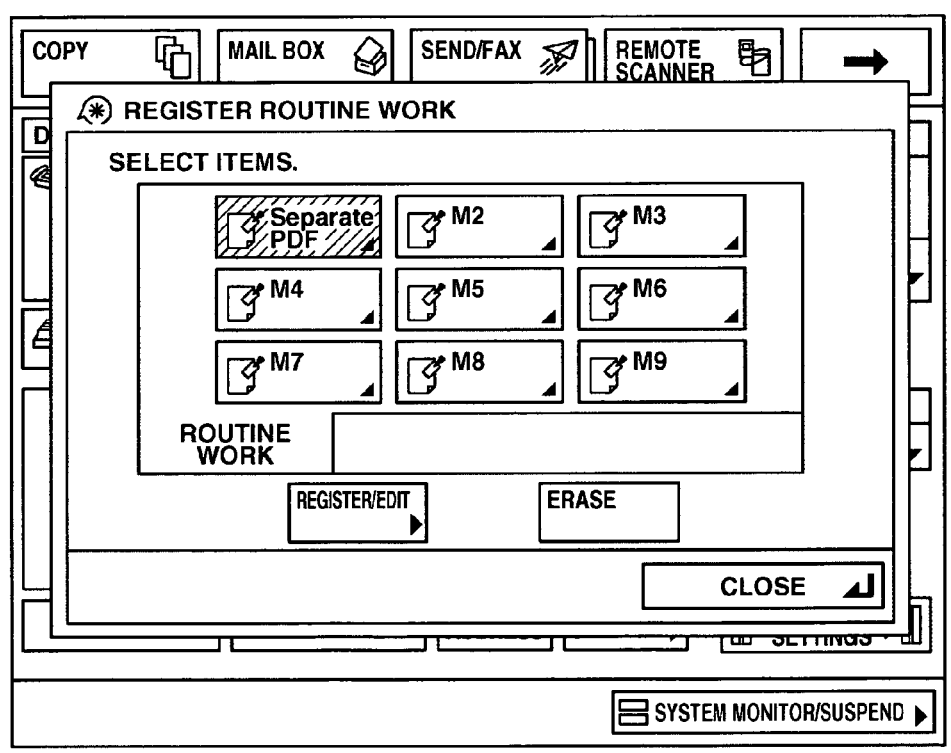
FIG. 14 is a view showing an exemplary display shown when the registration of the routine work is completed.

Here, for example, if the user selects the "Retrieve from Address Book" button 1203 and pushes down the OK button 1207, the registration of the destination specification method is completed and the routine work registration confirmation dialogue (FIG. 13) is displayed. If a cancel button 1206 is pushed down, the registration confirmation dialogue 1000 shown in FIG. 10 is displayed, and further, if the "Yes" button 1001 is successively pushed down, or otherwise, if a "Yes" button is selected in the picture shown in FIG. 13, the registration of the routine work is completed (FIG. 14). Note that the content of the routine work can be changed after being registered. The change of the content of the registration of the routine work can be made by pushing down a "Register/Edit" button in FIG. 14.

There are two types of modes for retrieval from the server, namely, a simple retrieval mode as shown in FIG. 27 and the detailed retrieval mode as shown in FIG. 28. When a "To Detailed Retrieval" button 2701 is selected in the simple retrieval mode, a detailed retrieval display shown in FIG. 28 is displayed. If a "To Simple Retrieval" button 2801 is selected in the detailed retrieval mode, on the contrary, a simple retrieval display shown in FIG. 27 id displayed. In addition, it is possible to recall the sending destination data stored in the database on the server by retrieval by using any one of the retrieval displays.

Figure 15:
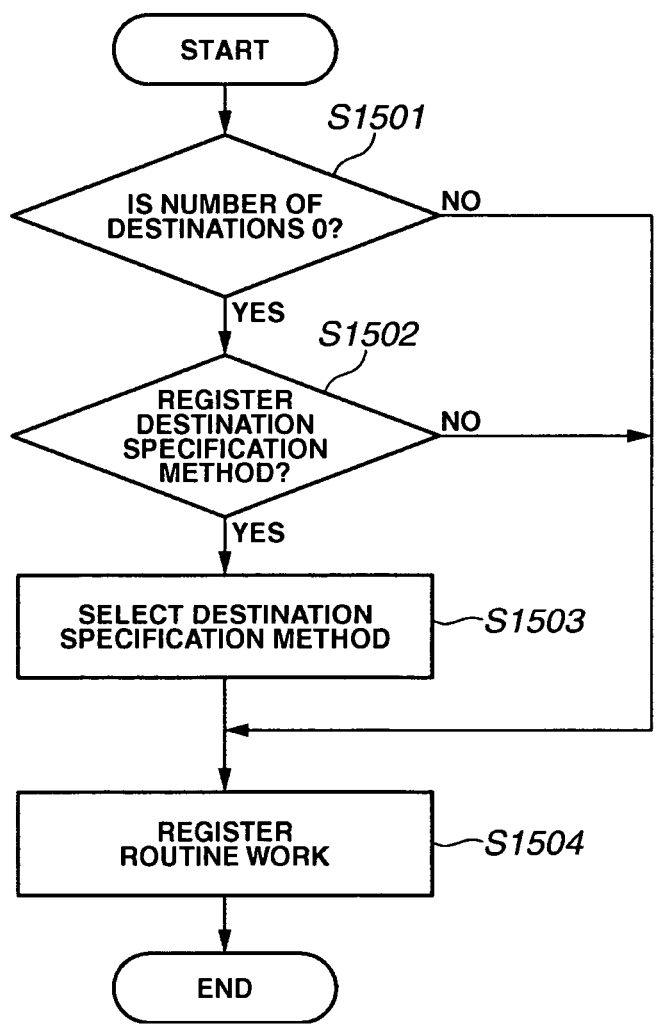
FIG. 15 is a flow chart illustrating an exemplary registration of the routine work (in a case where the number of sending destinations is zero).

The contents of the settings registered in the displays shown in FIG. 6 and FIGS. 8 through 14 indicate job settings, as described below, for example, and it is possible to execute the job in this state. An exemplary list of the aforementioned job settings is shown below:
  Number of Destinations: 0
  Scanning Color: Color
  Resolution: 400×400 Dpi
  File Format: PDF
  Reading Size: Auto
  Scanning Density: 12
  Type of Original: Text/Photograph
  Page Consecutive Copy: Opening to Left
  Sending Destination Specification Method: Address Book FIG. 15 is a flow chart for explaining a routine work registration operation. Note that the registration operation is controlled by the CPU 201. First, a content desired to be registered is set (FIG. 8) and the registration of the routine work is started.

In step S1501, it is determined whether the number of destinations of the content of the routine work registration is zero or not. At this time, it is determined if the sending destination is previously set or not, and accordingly, if the result of determination in step S1501 is not "zero", the processing passes the flow and completes the registration of the routine work in step S1504. Thus, the processing ends.

If the number of destinations of the content of the routine work registration is zero in step S1501, the processing proceeds to step S1502. In step S1502, it is determined whether the user selects to register the destination specification method or not (for example, it is possible that it is determined whether the selection is made within a prescribed period of time or not and the registration processing ends after a lapse of the prescribed time). If the user does not select to register the destination specification method in step S1502, the processing passes the flow and completes the registration of the routine work in step S1504. Thus, the processing ends. If the user selects to register the destination specification method in step S1502, the processing proceeds to step S1503.

In step S1503, one of a plurality of destination specification methods shown in FIG. 12 is selected, and the processing is shifted to step S1504 after the selection. As described above, in step S1504, the registration of the routine work is completed and the registration processing ends.

Next, the recalling of the routine work and the destination specification method according to the first embodiment are explained. Note that here, the explanation is made as to a case where a sending initial display is set to a sending routine work display (FIG. 7).

First, in the sending initial display in FIG. 7, in a case where the routine work registered in the processing described above is recalled by pushing down a button 701, when the address book is registered as the sending destination specification method, for example, the address book dialogue 1600 (FIG. 16) is displayed. At this time, when the user selects the sending destination (here, "shimizu" 1603) and pushes down an OK button 1601, an address of "shimizu@abc.co.jp" is set as the sending destination and is displayed (FIG. 17).

Figure 17:
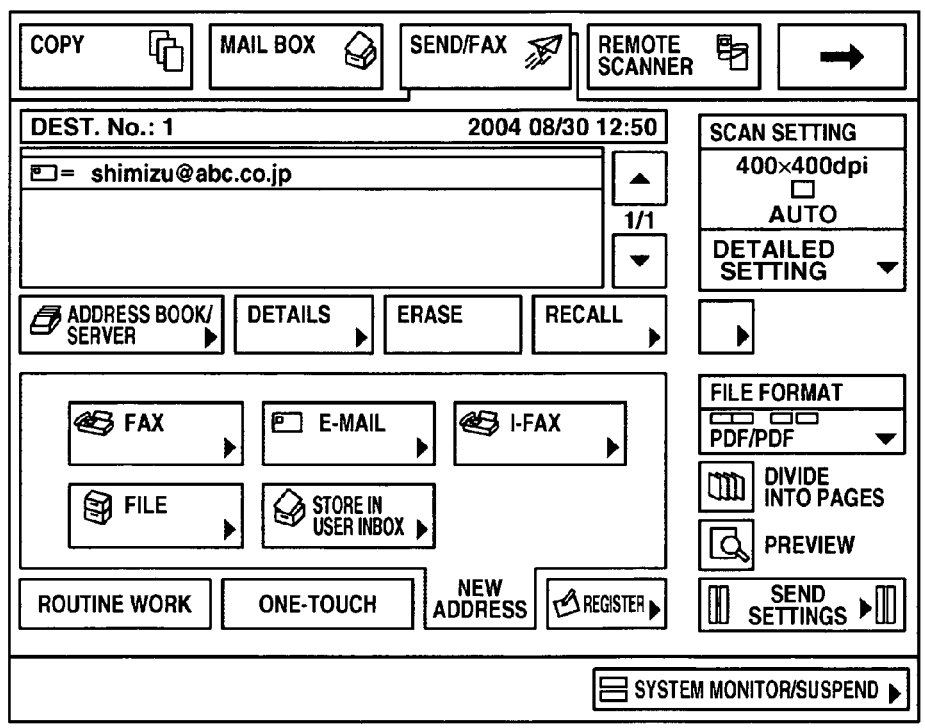
FIG. 17 is a view showing an exemplary display in which the sending destination is specified.

Then, if the user pushes down the start key 405 (see FIG. 4) in the state where the picture (UI) shown in FIG. 17 is displayed, image data can be sent.

Note that in the present embodiment, a method for processing the sending job data to be processed (a mode for executing the sending job) can be previously registered in response to the operation by the user. The function of registering the routine work is an example of this configuration. In addition, at the time of registering the routine work, the method for processing the image data to be sent is previously registered by the user. For example, the copying machine 101 is controlled so that processing condition parameters defining the execution mode of the sending job, as listed below, can be previously registered by the user. An exemplary list of processing condition parameters is shown below:
  (1) Setting of the scanning color
  (2) Setting related to the resolution
  (3) Setting related to the file format
  (4) Setting related to the size of the original to be read
  (5) Setting related to a scanning density
  (6) Setting related to the type of the original
  (7) Setting related to the page consecutive copy Therefore, in a case where the picture shown in FIG. 17 is displayed by the display section by executing the function of reading the routine work, the processing condition parameters as listed above related to the setting in relation to the routine work are read. In addition, the control is carried out so that the content of the read processing condition parameters is reflected on the picture shown in FIG. 17. In addition, when the start key 405 is pushed down by the user, the copying machine 101 is controlled so that the data sending processing in accordance with the content of the processing condition parameters that are previously set is executed.

In the present embodiment, the copying machine 101 executes various kinds of processings in accordance with the setting conditions related to the sending processing with respect to the data of the job to be sent. Further, the control is carried out so that the sending job data that is subjected to the processing can be sent to an external destination desired by the user. However, the control in relation to the destination of the sending job data is configured so that the control described in the present embodiment is carried out.

Figure 18:
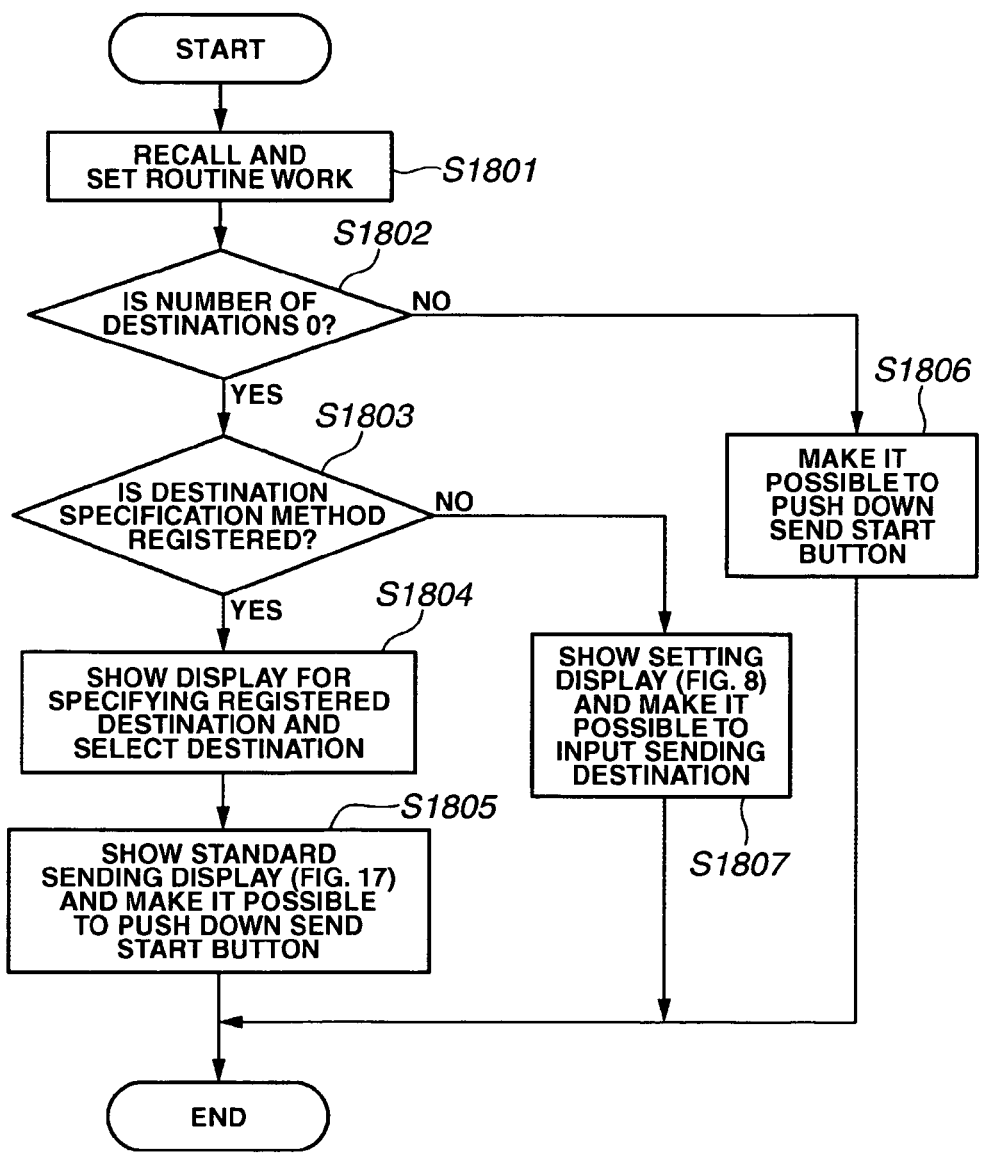
FIG. 18 is a flow chart illustrating an exemplary recalling of a routine work (in a case where the number of sending destinations is zero).

Now, an exemplary operation of recalling the routine work is explained with reference to the flow chart shown in FIG. 18. First, in step S1801, the routine work that has been registered is recalled. Instep S1802, it is determined whether the number of destinations of the registered content of the routine work that is recalled is zero or not, in other words, it is determined whether the destination is already registered (whether the sending destination is determined) or not. If the number of destinations is zero, the processing is continues to step S1803, and if the number of destinations is not zero, the processing is moves to step S1806.

In step S1803, it is determined whether the destination specification method is registered or not. If the destination specification method is registered, the processing is moves to step S1804, and if the destination specification method is not registered, the processing moves to step S1807. In step S1804, the picture of the registered destination specification method is displayed in order for the user to select the destination, and if the destination is selected, the processing continues to step S1805.

In step S1805, the standard sending display shown in FIG. 17 is displayed in order for the user to push down the sending start key 405, and then the processing ends. On the other hand, in step S1806, since the sending destination is already determined, it is made possible to push down the sending start key 405, and then processing ends. In addition, in step S1807, the setting display shown in FIG. 8 is displayed, and it is made possible to input the sending destination by a keyboard, for example, and then the processing ends.

Figures 21, 22:
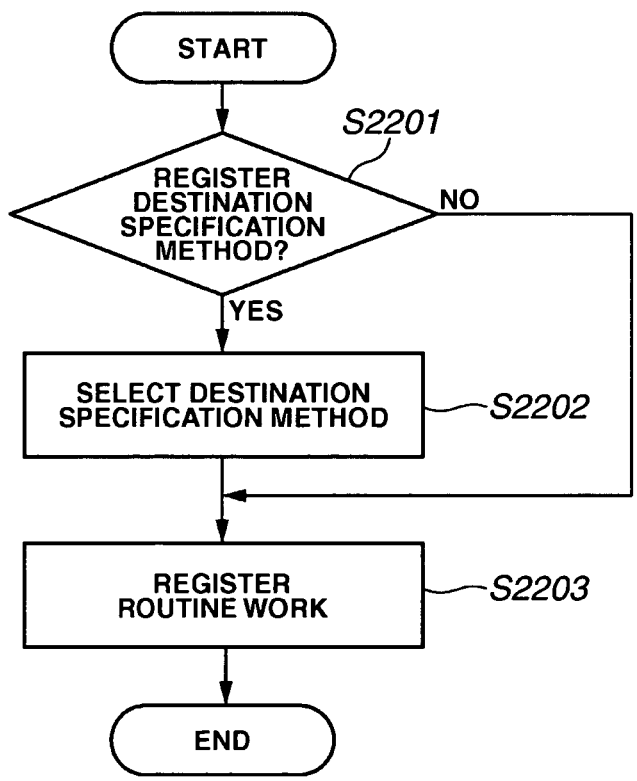
FIG. 21 is a view showing an exemplary data structure for managing a content of setting of the routine work.
FIG. 22 is a flow chart illustrating an exemplary registration of the routine work (not related to the number of sending destinations).

Next, an exemplary data configuration according to the first embodiment is explained with reference to FIGS. 19 through 21. The routine work of the sending/FAX function is managed with a table as shown in FIG. 19. "* nameString" in FIG. 19 indicates a registered name of the routine work, and the content thereof is managed in a manner as shown in FIG. 20. In addition, "* settingTable" in FIG. 19 indicates a set content of each routine work, and the content thereof is managed in a manner as shown in FIG. 21.

The methods for managing the routine work of "* nameString" and "* settingTable" are used in a conventional method. However, in the present embodiment, sending destination specification method information is retained contingent on the routine work managing table.

By using the data configuration as described above, the routine work data used in a non-compliant conventional copying machine not can readily be utilized for the routine work of the copying machine in compliance with the present invention. In this case, in the conventional copying machine, there exists no information to be stored with respect to the sending destination specification method shown in FIG. 19. However, it is possible to solve this by storing a symbol (herein, "null") indicating that there exists no data stored in the content of the sending destination specification method. It is possible to utilize the routine work utilized in the conventional copying machine as it is by effecting a definition such that the sending standard picture is displayed if the content of the sending destination specification method is null.

[Second Exemplary Embodiment]

In the second embodiment of the present invention, it is possible to register the sending destination specification method regardless of the presence or absence of the registered sending destination at the time of the registration of the routine work.

FIG. 22 shows a flow chart with respect to the registration of the routine work according to the second embodiment. In the second embodiment, an example is used in a case where "Mr. A", for example, is registered to be a destination to whom the sending is always made, but other persons, namely, "Mr. B", "Mr. C" and others, are added as the sending destination in every sending occasion. In addition, the destination specification method shown in FIG. 22 is a method in which the destination specification method in adding "Mr. B", "Mr. C" and others as the sending destination is previously registered.

First, a content desired to be registered is set and the registration of the routine work is started. Then, the processing proceeds to step S2201. In step S2201, it is determined whether the user selects to register the destination specification method or not. If it is determined that the user does not select to register the destination specification method in step S2201, the processing moves to step S2203. In step S2203, the routine work is registered and the operation ends.

If it is determined that the user selects to register the destination specification method in step S2201, the processing continues to step S2202. In step S2202, for example, the destination specification method is selected from among those shown in FIG. 12. Then, the processing continues to step S2203. In step S2203, the routine work is registered and the operation ends.

After that, regardless of the presence or absence of the registered sending destination when the routine work is recalled, if the sending destination specification method is registered, a sending destination specification display corresponding to the registered destination specification method is displayed.

Figures 23, 24:
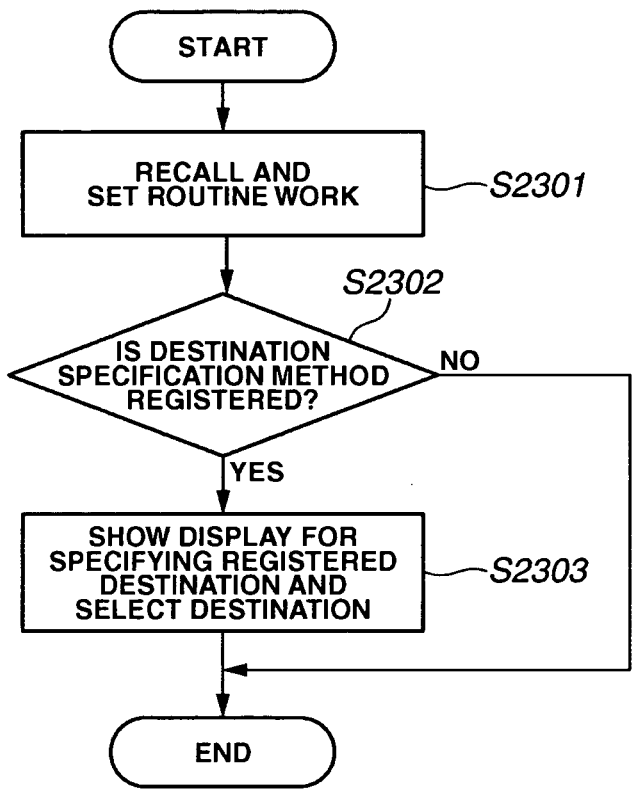
FIG. 23 is a flow chart illustrating an exemplary recalling of the routine work (not related to the number of sending destinations).
FIG. 24 is a view showing an exemplary data structure for managing a content of the routine work.
Figure 25:
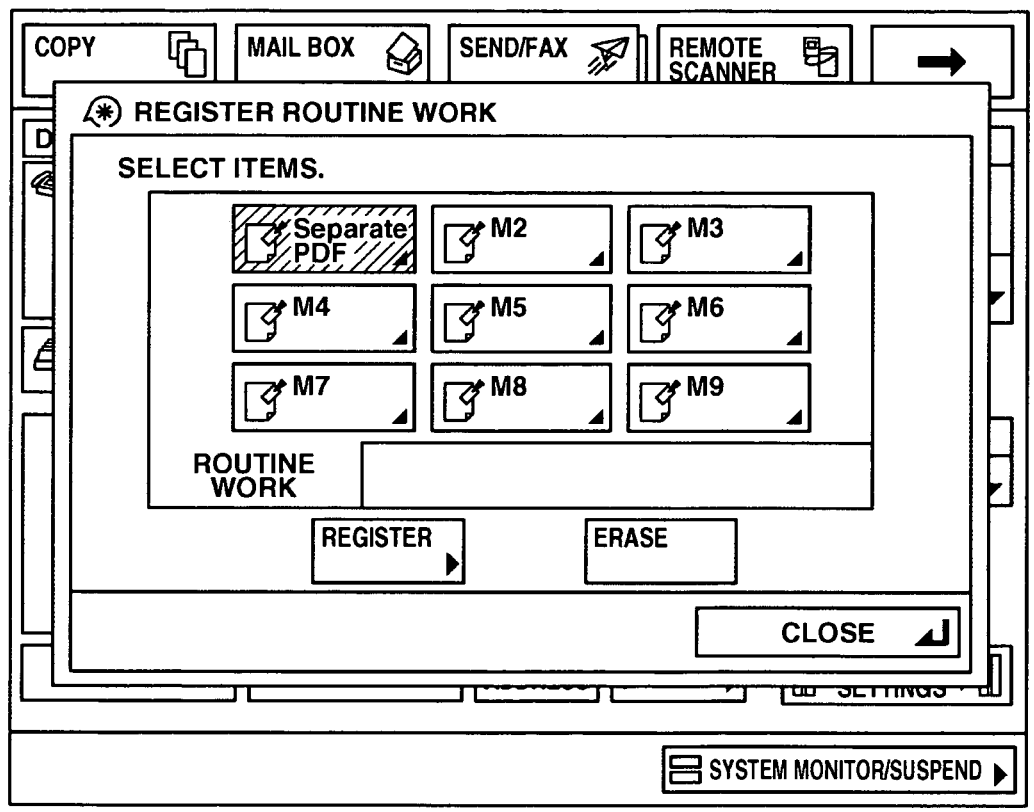
FIG. 25 is a view showing an exemplary display for registering the routine work (in which the content of the routine work cannot be changed again).

FIG. 23 shows a flow chart with respect to the operation of displaying the destination specification display after the routine work is recalled. First, in step S2301, the registered routine work is recalled. Then, the processing continues to step S2302. In step S2302, it is determined whether the destination specification method is registered or not at the time of the registration of the routine work. If the destination specification method is not registered, the processing ends. If it is determined that the destination specification method is registered in step S2302, the processing continues to step S2303.

In step S2303, the picture of the registered destination specification method is displayed in order for the user to select the destination. If the destination (Mr. A) is already registered, the selected destination (Mr. B and/or Mr. C) is added or changed, and the processing ends.

Note that in the present embodiment, the data configuration is as shown in FIG. 24. In other words, the routine work of the sending/FAX function is managed with a table as shown in FIG. 24, and the content of "* nameString" in FIG. 24 directly refers to each item of the table shown in FIG. 20. The content of "* settingTable" represents, for example, XML data obtained by developing a file retaining the content of the setting of the routine work in the XML format on a memory. With regard to the content of the setting managed in the XML format, the "Sending Destination Specification Method" is managed by one tag, and other setting contents such as "Scanning Color" and "Resolution" are managed by the respective tags.

By using the data configuration as described above, it is easy to utilize the routine work data used in a non-compliant conventional copying machine for the routine work of the copying machine in compliance with the present invention. For example, when the setting content is managed with the XML, the present invention can be implemented in two methods as described below. The first method is to describe the content managed by the "Sending Destination Specification Method" tag as "null". The second method is that in a case where there is no "Sending Destination Specification Method" tag and the content of the "Sending Destination Specification Method" tag is referred to, the same method as in the case where the setting content is null is employed.

Even when the configuration described above is employed, it is possible to utilize the routine work data used in a non-compliant copying machine with the present invention for the routine work of the conventional copying machine not in compliance with the present invention. This is because if the setting content is managed with the XML, the data configuration to be referred to, such as a table, is not changed even when the "Sending Destination Specification Method Data" is newly increased.

As described above, if the setting content is managed with the XML, it is possible to bi-directionally utilize the routine work data, and it is possible to effect the data configuration of a higher extensibility.

Further, it is noted that with regard to the content of the registered routine work, the setting is set so that it is possible to edit the content in FIG. 14. However, as shown in FIG. 26, it is possible that no change can be made as to the content after the content is registered.

[Third Exemplary Embodiment]

The information processing apparatus having the configuration as described in the first and second embodiment above may be further provided with a configuration as described in the third embodiment below. Here, an explanation is made as to the registration of the routine work according to the third embodiment with reference to FIG. 6, FIGS. 8 through 11, and FIGS. 13 and FIG. 14.

In the sending standard picture (FIG. 6), the content desired to be registered is set (FIG. 8). Then, when the setting is made and the "Register" button 804 is pushed down, the registration destination selection dialogue 900 (FIG. 9) is displayed. When the "Register Routine Work" button 901 is selected, the routine work registration confirmation dialogue 1000 (FIG. 10) is displayed.

If the "Yes" button 1001 is selected at this time, the destination specification method registration confirmation dialogue 1100 (FIG. 11) is displayed. Then, when the "Yes" button 1101 is selected, the system automatically selects the destination specification method, and the routine work registration confirmation dialogue (FIG. 13) is displayed. Then, when the "Yes" button is selected, the registration of the routine work is completed (FIG. 14).

Exemplary Controls of the Present Invention

Various kinds of controls that are used in the present invention, as explained in the first through the third embodiments described above, are now herein described in further detail below.

For example, a digital multifunction machine (the copying machine 102 or the copying machine 101) as one example of the information processing apparatus as described in the embodiments is capable of sending the sending job data to the external destination. In addition, in the information processing apparatus, it is possible to selectively utilize a plurality of kinds of destination specification methods as the method for specifying the destination of the sending job data.

In the embodiments, the plurality of kinds of destination specification methods include at least two types of destination specification methods as described below.

(First Destination Specification Method)

The first destination specification method is the method by which the user is enabled to specify the desired destination by utilizing the address book registered in a form of data in a memory unit provided in the information processing apparatus. More specifically, as shown in FIG. 26, the list of address books is displayed by the operation section. In addition, in this method, the control is carried out so that one or more destinations desired by the user can be selected and determined by the user as the sending destination of the data of the job to be sent at the time of sending from the information processing apparatus.

(Second Destination Specification Method)

The second destination specification method is the method by which the user is enabled to specify the desired destination by utilizing the retrieval from the server. For example, in this method, the user is enabled to specify the desired destination from the database managed by an external (or internal) server device that is capable of data communication with the information processing apparatus. More specifically, for example, a display for retrieval from the server as shown in FIG. 27 or FIG. 28 is displayed by the operation section. In addition, in this method, the control is carried out so that one or more desired destinations can be selected and determined by the user, from among selection candidates of the plurality of sending destinations whose data is retrieved via the picture for retrieval from the server, as the sending destination of the data of the job to be sent at the time of sending from the information processing apparatus.

Note that in the embodiments, it is possible to provide the above-described kinds of destination specification methods. However, the information processing apparatus in the embodiments can employ a configuration in which a destination specification method other than the above-described kinds of destination specification methods can also be utilized.

Furthermore, in the embodiments, control as described below, can be executed as a data processing method using the information processing apparatus. For example, in a case where a routine work button in the operation section of the information processing apparatus is pushed down, the controller unit 200 of the information processing apparatus automatically enables the user to utilize a destination specification method previously determined from among the plurality of kinds of destination specification methods in response to the button input. For example, the controller unit 200 automatically reads from the memory the destination specification method previously registered corresponding to the routine work button that is operated with the button input by the user among a plurality of routine work buttons displayed on the operation section 212. In addition, the controller unit 200 automatically allows the operation section 212 to display a destination specification picture corresponding to the read destination specification method.

When the registration of a routine work button is executed by the user, assume that a first destination specification method (the method in which the destination is specified from the address book) among the plurality of kinds of destination specification methods is set and registered correspondingly with the routine work button to be registered (hereinafter referred to as the first routine work button).

Here, assume that the first routine work button of which the above registration is effected is pushed down by the user via the operation section 212 among a plurality of routine work buttons (in the display example shown in FIG. 14, nine routine work buttons) at the time of setting when the data is sent. In this case, the controller unit 200, in response to the pushing down of the first routine work button, automatically allows the operation section 212 to display the address book shown in FIG. 16, for example. In addition, the controller unit 200 carries out the control so that one or more desired destinations can be selected by the user from the address book. Then, assume that the selection of the destination is finally determined by the user and the start key 405 is pushed down. In this case, the controller unit 200 controls the information processing apparatus so that the original image data of the sending job to be processed is sent to one or more destinations selected by the user from the address book.

On the other hand, for example, when the registration of a routine work button is executed by the user, assume that a second destination specification method (the method by which the destination is specified by utilizing the retrieval from the server) among a plurality of kinds of destination specification methods is set and registered correspondingly with the routine work button to be registered (hereinafter referred to as the second routine work button).

Then, assume that the second routine work button of which the above registration is effected is pushed down by the user via the operation section 212 among a plurality of routine work buttons (in the picture example shown in FIG. 14, nine routine work buttons) at the time of setting when the data is sent. In this case, the controller unit 200, in response to the pushing down of the second routine work button, automatically allows the operation section 212 to display a display picture for enabling the user to determine the destination by utilizing the function for retrieval from the server, as shown in FIG. 27 or FIG. 28. In addition, the controller unit 200 carries out the control so that one or more destinations desired by the user can be selected by the user via the picture for enabling the user to determine the destination by utilizing the function for retrieval from the server. In addition, assume that the destination selection is finally determined by the user and the start key 405 is pushed down. In this case, the controller unit 200, in response to the operation by the user, controls the information processing apparatus so that the original image data of the sending job to be processed is sent to one or more destinations selected by the user from among the destination candidates retrieved by the function for retrieval from the server.

Thus, assume that prescribed instructions such as input instruction and the like by the routine work button are inputted via the operation section 212 as a data processing method suitable for the information processing apparatus in the embodiments. In this case, the controller unit 200, in response to the button input operation, carries out the control so that the destination specification method previously specified and previously registered in relation to the button can be automatically utilized from among a plurality of kinds of destination specification methods that can be provided by the information processing apparatus.

In addition, the controller unit 200, by using the destination specification method previously determined, carries out the control so that the destination of the data of the sending job to be sent can be selected by the user via the operation section 212. In other words, the controller unit 200, in response to the pushing down of the routine work button, carries out the control so that an operation mode of the information processing apparatus is automatically shifted to a mode in which the desired destination can be selected by the user by utilizing the destination specification method previously associated with the button among the plurality of kinds of destination specification methods. In addition to this, the controller unit 200 controls the information processing apparatus so that the data of the sending job is sent to the destination selected and determined by the user via the operation section 212 by using the destination specification method previously specified from among the plurality of kinds of destination specification methods.

With the above configuration as the premise, further, the controller unit 200 is capable of carrying out the control of the information processing apparatus (the copying machine 101 or the copying machine 102) as described below.

For example, in the embodiments, with respect to the routine work button, the user is enabled to register, in advance, a destination specification method desired from among the plurality of kinds of destination specification methods in the memory unit. That is, in the embodiments, the routine work button can be associated with the destination specification method. However, the registration is not limited to this. In the embodiments, the control is carried out so that the processing condition parameters for determining how the data of the sending job to be sent is processed and sent by the information processing apparatus can be previously registered with the routine work button by the user via the operation section 212. For example, in the embodiments, the setting as described in the above items (1) through (7) can be registered as sending processing condition parameters.

With the configuration described above, with respect to the first routine work button in which the method for specifying the destination from the address book as the sending specification method is previously registered with the memory unit, setting values desired by the user can be registered with the memory unit for a plurality of processing conditions of the above items (1) through (7), for example. Here, in relation to the first routine work button, assume that processing condition parameters as described below are set and registered, for example. (i) The setting value of the size of the original to be read is "A4 size". (ii) The setting value of the resolution is "200×200 dpi". (iii) The setting value of the density is "Thick". (iv) The setting value of the image quality is "Text". (v) The setting value of the magnification is "Direct". Assume that the plurality of processing condition parameters as described above are previously registered with the memory unit in association with the first routine work button in response to the operation by the user via the operation section 212.

Assume that, after the above registration is effected, for example, the first routine work button among a plurality of routine work buttons (in the picture example shown in FIG. 14, nine routine work buttons) is pushed down by the user via the operation section 212 at the time of the setting when the data is sent. In this case, the controller unit 200, in response to the pushing down of the first routine work button, allows the operation section 212 to automatically display the address book shown in FIG. 16, for example. Then, the controller unit 200 carries out the control so that one or more desired destinations can be selected by the user from the address book. In addition, the controller unit 200 reads the parameters (i) through (v) of the sending processing conditions registered in relation to the first routine work button and allows the operation section 212 to display the read parameters. Thereby, the controller unit 200 allows the user to confirm the content of the processing conditions related to the sending job associated with the first routine work button via the operation section 212. In addition, the controller unit 200 carries out the control so that the setting of the processing condition parameters can be changed by the user via the operation section 212 as desired. Note that in this example, it is assumed that there is no special change in the setting.

Assume that, after the series of operation controls described above are executed, the destination selection of the data of the sending job to be sent is finally determined by the user and the start key 405 is pushed down. The controller unit 200, in response to the operation by the user, controls the information processing apparatus so that the processing in accordance with the settings (i) through (v) related to the sending processing associated with the first routine work button is executed for the original image data of the sending job to be processed. In addition, the controller unit 200, after carrying out the processing of the settings (i) through (v), carries out the control so that the processed original data of the job is sent to the destination desired by the user. That is, the controller unit 200 carries out the control so that the processed original image data is sent to one or more destinations selected by the user via the address book automatically displayed by the operation section 212 in accordance with the destination specification method associated with the first routine work button.

On the other hand, the user is also enabled to register desired setting values for processing conditions associated with the second routine work button mentioned above with which the method for utilizing the function for retrieval from the server is registered as the sending destination specification method, independently of the sending processing condition parameters associated with the first routine work button.

Here, assume that the processing condition parameters as described below, for example, are set and registered in relation to the second routine work button. (i) The setting value of the size of the original to be read is "A3 size". (ii) The setting value for the resolution is "600×600 dpi". (iii) The setting value for the density is "Thin". (iv) The setting value for the image quality is "Photograph". (v) The setting value of the magnification is "Direct". Assume that the plurality of processing condition parameters as mentioned above are previously registered in the memory unit in association with the second routine work button in response to the operation by the user via the operation section 212.

Assume that, after the above registration is effected, the second routine work button, for example, among a plurality of routine work buttons (in the picture example shown in FIG. 14, nine routine work buttons) is pushed down by the user via the operation section 212 at the time of the setting when the data is sent. In this case, the controller unit 200, in response to the pushing down of the second routine work button, allows the operation section 212 to automatically display the picture for enabling the user to determine the destination by the function for retrieval from the server, as shown in FIG. 27 or FIG. 28.

In addition, the controller unit 200 carries out the control so that one or more desired destinations can be selected by the user via the picture that enables the user to determine the destination by the function for retrieval from the server. In addition, the controller unit 200 reads the parameters (i) through (v) of the sending processing conditions registered in relation to the second routine work button form the memory unit, and allows the operation section 212 to display the read parameters. Thereby, the controller unit 200 allows the user to confirm the content of the processing conditions related to the sending processing associated with the second routine work button via the operation section 212. In addition, the controller unit 200 carries out the control so that the setting of the processing condition parameters can be changed by the user via the operation section 212 as desired. Note that it is assumed that there is no special change in the setting.

Assume that, after the series of operation controls mentioned above are executed, the destination selection of the data of the sending job to be sent is finally determined by the user and the start key 405 is pushed down. In this case, the controller unit 200, in response to the operation by the user, controls the information processing apparatus so that the processing in accordance with the settings (i) through (v) related to the sending processing associated with the second routine work button is executed for the original image data of the sending job to be sent. In addition, the controller unit 200, after carrying out the processing of the settings (i) through (v) mentioned above, carries out the control so that the processed original data of the job is sent to one or more destinations desired by the user. In other words, the controller unit 200 carries out the control so that the processed original image data is sent to the destination selected by the user via the list of candidates selectable as the sending destination automatically displayed by the operation section 212 on the basis of the result of the retrieval from the server in accordance with the destination specification method associated with the second routine work button.

As described above, in the embodiments, the user is enabled to register, in advance, the desired sending destination specification method from among a plurality of kinds of sending destination specification methods with respect to each routine work button, and is also enabled to register, in advance, the desired sending processing condition parameters with respect to each routine work button. In addition, the control is carried out so that, in response to the pushing down of any button of the plurality of routine work buttons, an operation mode is activated for enabling the user to select the desired destination by utilizing the destination specification method corresponding to the button. In addition, the sending processing condition parameters associated with the button is automatically read from the memory unit and the control is carried out so that the sending processing condition parameters can be utilized for the original data of the sending job.

In addition, the control is carried out so that the value of the parameters can be confirmed by the user via the operation section 212. In addition, the information processing apparatus is controlled so that the various kinds of processings corresponding to the data sending processing in accordance with the sending processing condition parameters can be executed with respect to the original image data to be sent. In addition thereto, the information processing apparatus is controlled so that the processed original image data is sent to the external destination determined by the user by utilizing the sending destination specification method associated with the button.

The controller unit 200 is configured so that the above control can be executed, and in addition, the controller unit 200 is configured so that various kinds of controls as described below can be executed.

For example, the controller unit 200 is configured so that the desired destination specification method is registered with each of the first routine work button and the second routine work button mentioned above, independently from each other, in accordance with the instruction from the user. An operation flow in which the destination specification method is previously registered with the routine work button serves as the operation mode for making a definition as to what type of destination specification method is utilized to enable the user to determine the sending destination when the user later determines the sending destination of the data of the sending job. In other words, in a case where the destination specification method is registered with the routine work button, the user is enabled to finally determine the destination to which the data of the job is actually sent via the operation section 212 immediately before sending the data of the job from the information processing apparatus.

In the embodiments, the control is carried out, in addition to the above control, so that the destination to be the sending destination of the data is registered, for one routine work button, for example, by the user in the memory unit by previously determining the destination desired by the user (that is, regardless of whether the number of destinations is one or more) and associating the determined destination with the button.

For example, assume that, for a third routine work button, instead of the destination specification method as described above being registered by the user, two external destinations in total, namely, the client computer 105 shown in FIG. 1 as a first destination and an external computer (not shown) as a second destination, are previously registered by the user. In this case, the e-mail addresses of the two computers are registered as the destination information. In addition, assume that, for example, processing condition parameters as described below are set and registered with respect to the third routine work button. (i) The setting value of the size of the original to be read is "B5 size". (ii) The setting value of the resolution is "200×200 dpi". (iii) The setting value of the density is "Normal". (iv) The setting value of the image quality is "Text". (v) The setting value of the magnification is "Direct". Assume that the plurality of processing condition parameters as described above are previously registered in the memory unit in association with the third routine work button by the user operation via the operation section 212.

Assume that, after the registration as described above is effected, for example, the third routine work button among a plurality of routine work buttons (in the picture example shown in FIG. 14, nine routine work buttons) is pushed down by the user via the operation section 212 at the time of the setting when the data is sent. In this case, the controller unit 200, in response to the pushing down of the third routine work button, automatically sets the two external computers mentioned above as the destinations and displays the information of the destinations in a destination display region on the sending setting picture shown in FIG. 6, for example.

In addition, the controller unit 200 reads the parameters (i) through (v) of the sending processing conditions registered in relation to the third routine work button and allows the operation section 212 to display the read parameters. Thereby, the controller unit 200 allows the user to confirm the content of the processing conditions related to the sending job associated with the third routine work button via the operation section 212. In addition, the controller unit 200 carries out the control so that the setting of the parameters of the processing conditions can be changed by the user via the operation section 212 as desired. Note that in this example, it is assumed that there is no special change of the setting.

Assume that, after the series of the operation controls as mentioned above are executed, the destination selection of the data of the sending job to be processed is finally determined by the user and the start key 405 is pushed down. In this case, the controller unit 200, in response to the operation by the user, controls the information processing apparatus so that the processing in accordance with the settings (i) through (v) related to the sending processing associated with the third routine work button is executed with respect to the original image data of the sending job to be sent. In addition, the controller unit 200, after carrying out the processing of the settings (i) through (v), carries out the control so that the processed original data of the job is sent to the two external computers previously registered by the user. That is, the controller unit 200 carries out the control so that the processed original image data to which the processing in accordance with the sending processing condition associated with the third routine work button is executed is sent to the specified external destinations associated with the third routine work button.

In a case where the input of the third routine work button is executed by the user via the operation section 212 and the destination information of the destination to which the data of the sending job is to be sent is previously registered in the memory unit in association with the third routine work button, the controller unit 200 carries out the above-described control. That is, the controller unit 200 carries out the control so that the external destination corresponding to the destination information previously registered in the memory unit in association with the third routine work button is automatically selected. In addition, the controller unit 200 controls the information processing apparatus so that the processing in accordance with the sending processing condition previously registered in the memory unit in association with the third routine work button can be executed with respect to the original data of the job to be sent. In addition, after carrying out the processing to the original data of the sending job to be sent, the controller unit 200 controls the information processing apparatus so that the processed original image data can be sent to the external destination described above that is automatically selected.

Note that, as compared to the example of control using the first routine work button and the example of control using the second routine work button, the controller unit 200 is capable of executing the control as described below.

For example, assume that, after the various kinds of previous registrations described above are performed, a button input of either of the first routine work button or the second routine work button is executed by the user via the operation section 212. This case is equivalent to the case where the destination information of the destination to which the data of the sending job is to be sent is not previously registered in the memory unit. In such a case, the controller unit 200 carries out the control so that the destination specification method previously specified and associated with the button that is pushed down can be automatically utilized. For example, in the above example, the setting that enables the user to elect the desired destination from the address table is registered with the first routine work button. In addition, the setting is registered with the second routine work button so that the destination can be selected by the user by utilizing the retrieval from the server and on the basis of the result of the retrieval. Therefore, if either of the buttons is pushed down, the controller unit 200 carries out the control so that the destination of the data of the sending job can be selected by the user via the operation section 212.

On the other hand, assume that the input of the third routine work button is executed by the user via the operation section 212. This case is equivalent to the case where the destination information of the destination to which the data of the sending job is to be sent is previously registered in the memory unit. In such a case, the controller unit 200 carries out the control so that the fixed destination whose destination information is previously registered in the memory unit in association with the third routine work button is automatically selected. In addition, the controller unit 200 carries out the control so that the information processing apparatus can send the data of the sending job to the selected destination.

By employing the configuration of the various types of control examples described above, it is possible to address various kinds of problems assumed in the conventional technology. In addition, it is possible, for example, to make the operational process required for the user in the case of sending the data as simple as possible and to structure a data sending environment in which operability is favorable to the user. In addition, it is possible, for example, to minimize the operational process to specify and change the sending destination related to the data transmission. Thus, it is possible to flexibly meet various kinds of assumable needs by the user related to the function for sending the data. Note that various kinds of controls other than the controls described in the above control examples are carried out by the controller unit 200 to execute the control described in the first through the third embodiments. Thereby, it is possible to further enhance the effects described above.

Other Exemplary Embodiments, Features and Aspects of the Present Invention

The present invention can also be achieved by providing a system or a device with a non-transitory computer readable storage medium which records program code of software implementing the function of the embodiments and by reading and executing the program code stored in the storage medium with a computer (central processing unit (CPU) or micro processing unit (MPU) of the system or the device. In this case, the program code itself, which is read from the storage medium, implements the function of the embodiments mentioned above, and accordingly, the storage medium storing the program code constitutes the present invention. The storage medium for supplying such program code includes, for example, a floppy disk, a hard disk, an optical disk, a magneto-optical disk, a compact disc-read-only memory (CD-ROM), a compact disc-recordable (CD-R), a magnetic tape, a nonvolatile memory card, and a read-only memory (ROM).

In addition, the function according to the embodiments described above is implemented not only by executing the program code read by the computer, but also implemented by the processing in which an OS (operating system) or the like carries out a part of or the whole of the actual processing on the basis of the instruction given by the program code.

Furthermore, in another aspect of the embodiment of the present invention, after the program code read from the storage medium is written in a memory provided in a function expanding unit connected to the computer or a function expanding board inserted in the computer, a CPU or the like provided in the function expanding board or the function expanding unit carries out a part of or the whole of the processing to implement the function of the embodiments as described above.

In addition, it is needless to say that the present invention can also be achieved by distributing the program code that implements the functions of the above embodiments via a network, thereby storing the program code in a storage unit such as a hard disk, a memory, and the like of the system or the apparatus or in a storage medium such as a compact disc-rewritable (CD-RW), a CD-R, and the like, and by reading and executing the program code stored in the storage unit or the storage medium by a computer (CPU or MPU) of the system or the apparatus.

By employing the configuration of the above embodiments, it is possible to prevent the problems assumed in relation to the conventional technology from occurring. In addition, it is possible to make the operational process required to the user in the case of sending the data as simple as possible and to structure the data sending environment in which operability is favorable to the user. Furthermore, it is possible to minimize the operational processing in specifying and changing the sending destination related to the data sending operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2004-364776 filed Dec. 16, 2004, and related 2005-294034 filed Oct. 6, 2005, which are hereby incorporated by reference herein in their entirety.

What is claimed is:

1. A data transmitting apparatus for transmitting data, comprising:
a first input unit configured to input a scan setting for scanning a document and generating data;
a first registering unit configured to register, in association with a button, the scan setting input by the first input unit;
a second input unit configured to input an obtaining destination from which the data transmitting apparatus obtains destination address data;
a second registering unit configured to register, in association with the button, the obtaining destination input by the second input unit;
a display unit configured to display the button;
a control unit configured to read, in a case where the button is designated and the button is registered in association with an external apparatus, the scan setting registered in association with the button and display a screen for displaying the destination address data obtained by the data transmitting apparatus from the external apparatus registered in association with the button, and to read, in a case where the button is designated and the button is registered in association with an address book stored in the data transmitting apparatus, the scan setting registered in association with the button and display a screen for displaying the destination address data obtained by the data transmitting apparatus from the address book registered in association with the button; and
a transmitting unit configured to transmit the data scanned according to the scan setting set by the control unit, to a destination specified based on the destination address data displayed on the screen.

2. The data transmitting apparatus according to claim 1, further comprising:
a third input unit configured to input a destination;
wherein the transmitting unit transmits the data to the destination input by the third input unit and the destination specified based on the destination address data displayed on the screen.

3. A control method for controlling a data transmitting apparatus for transmitting data, the control method comprising:
utilizing a processor to perform,
a first input step of inputting a scan setting for scanning a document and generating data;
a first registering step of registering, in association with a button, the scan setting input in the first input step;
a second input step of inputting an obtaining destination from which the data transmitting apparatus obtains destination address data;
a second registering step of registering, in association with the button, the obtaining destination input in the second input step;
a display step of displaying the button on a display unit;
a control step of reading, in a case where the button is designated and the button is registered in association with an external apparatus, the scan setting registered in association with the button and displaying, on the display unit, a screen for displaying the destination address data obtained by the data transmitting apparatus from the external apparatus registered in association with the button, and to read, in a case where the button is designated and the button is registered in association with an address book in the data transmitting apparatus, the scan setting registered in association with the button and display a screen for displaying the destination address data obtained by the data transmitting apparatus from the address book registered in association with the button; and
a transmitting step of transmitting the data scanned according to the scan setting set in the control step, to a destination specified based on the destination address data displayed on the screen.

4. A non-transitory computer readable storage medium for storing a computer program for controlling a data transmitting apparatus, the computer program comprising:
a code to input a scan setting for scanning a document and generating data;
a code to register, in association with a button, the input scan setting;
a code to input an obtaining destination from the data transmitting apparatus obtains destination address data;
a code to register, in association with the button, the input obtaining destination;
a code to display the button on a display unit;
a code to read, in a case where the button is designated and the button is registered in association with an external apparatus, the scan setting registered in association with the button and display, on the display unit, a screen for displaying the destination address data obtained by the data transmitting apparatus from the external apparatus registered in association with the button, and to read, in a case where the button is designated and the button is registered in association with an address book stored in the data transmitting apparatus, the scan setting registered in association with the button and display a screen for displaying the destination address data obtained by the data transmitting apparatus from the address book registered in association with the button; and a code to transmit the data scanned according to the scan setting, to a destination specified based on the destination address data displayed on the screen.

* * * * *